(12) United States Patent
Munro

(10) Patent No.: US 12,609,819 B2
(45) Date of Patent: Apr. 21, 2026

(54) METHODS FOR CREATING SECRET KEYS WITH A CHIEF DEVICE AND SYSTEMS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 348 days.

(21) Appl. No.: 18/070,191

(22) Filed: Nov. 28, 2022

(65) Prior Publication Data

US 2023/0208633 A1 Jun. 29, 2023

Related U.S. Application Data

(60) Provisional application No. 63/294,187, filed on Dec. 28, 2021.

(51) Int. Cl.
*H04L 9/32* (2006.01)
*H04L 9/08* (2006.01)

(52) U.S. Cl.
CPC .......... *H04L 9/0866* (2013.01); *H04L 9/0825* (2013.01)

(58) Field of Classification Search
CPC ...... H04L 9/0866; H04L 9/0825; H04L 9/085
USPC ........................................................ 713/171
See application file for complete search history.

(56) References Cited

U.S. PATENT DOCUMENTS

| | | | | |
|---|---|---|---|---|
| 2009/0052663 A1* | 2/2009 | Hammond | ............ | H04L 9/0838 380/44 |
| 2014/0044263 A1* | 2/2014 | King | ................... | H04W 12/033 380/270 |
| 2016/0344712 A1* | 11/2016 | Ding | ......................... | H04L 9/14 |
| 2020/0036524 A1* | 1/2020 | Norton | ................. | H04W 12/33 |
| 2021/0169337 A1* | 6/2021 | Freeman | ............ | H04W 12/069 |

OTHER PUBLICATIONS

International Preliminary Report on Patentability for PCT/US2022/054148, mailed Jul. 11, 2024.

* cited by examiner

*Primary Examiner* — Jeffrey C Pwu
*Assistant Examiner* — Samuel Ambaye
(74) *Attorney, Agent, or Firm* — Troutman Pepper Locke LLP

(57) ABSTRACT

A method and system for secure communications includes obtaining at a first device and a chief device signals based on movement of at least one of the devices between them. Both the first device and chief device convert the signals into identical first secret keys which are then stored. The method and system next includes obtaining at a second device and a chief device signals based on movement between them of at least one of the devices. Both the second device and chief device convert the signals into identical second secret keys which are then stored. The chief device then encrypts first secret key with second secret key and transmits to the second device which decrypts it with its copy of second secret key obtaining first secret key. These communicating devices can then transmit data between them securely encrypted and decrypted with the first secret key.

20 Claims, 17 Drawing Sheets

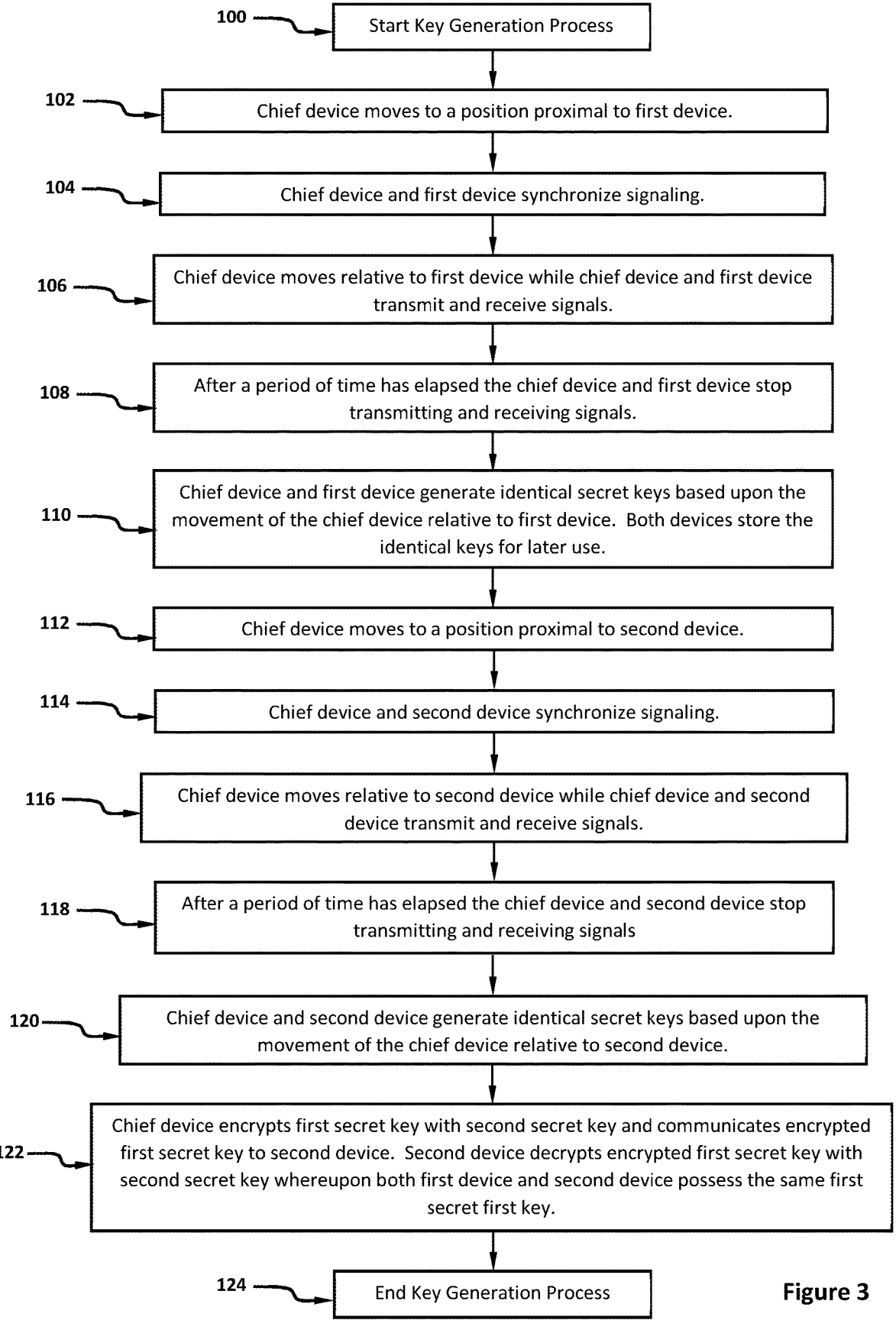

100 — Start Key Generation Process

102 — Chief device moves to a position proximal to first device.

104 — Chief device and first device synchronize signaling.

106 — Chief device moves relative to first device while chief device and first device transmit and receive signals.

108 — After a period of time has elapsed the chief device and first device stop transmitting and receiving signals.

110 — Chief device and first device generate identical secret keys based upon the movement of the chief device relative to first device. Both devices store the identical keys for later use.

112 — Chief device moves to a position proximal to second device.

114 — Chief device and second device synchronize signaling.

116 — Chief device moves relative to second device while chief device and second device transmit and receive signals.

118 — After a period of time has elapsed the chief device and second device stop transmitting and receiving signals 120 — Chief device and second device generate identical secret keys based upon the movement of the chief device relative to second device.

122 — Chief device encrypts first secret key with second secret key and communicates encrypted first secret key to second device. Second device decrypts encrypted first secret key with second secret key whereupon both first device and second device possess the same first secret first key.

124 — End Key Generation Process

Figure 3

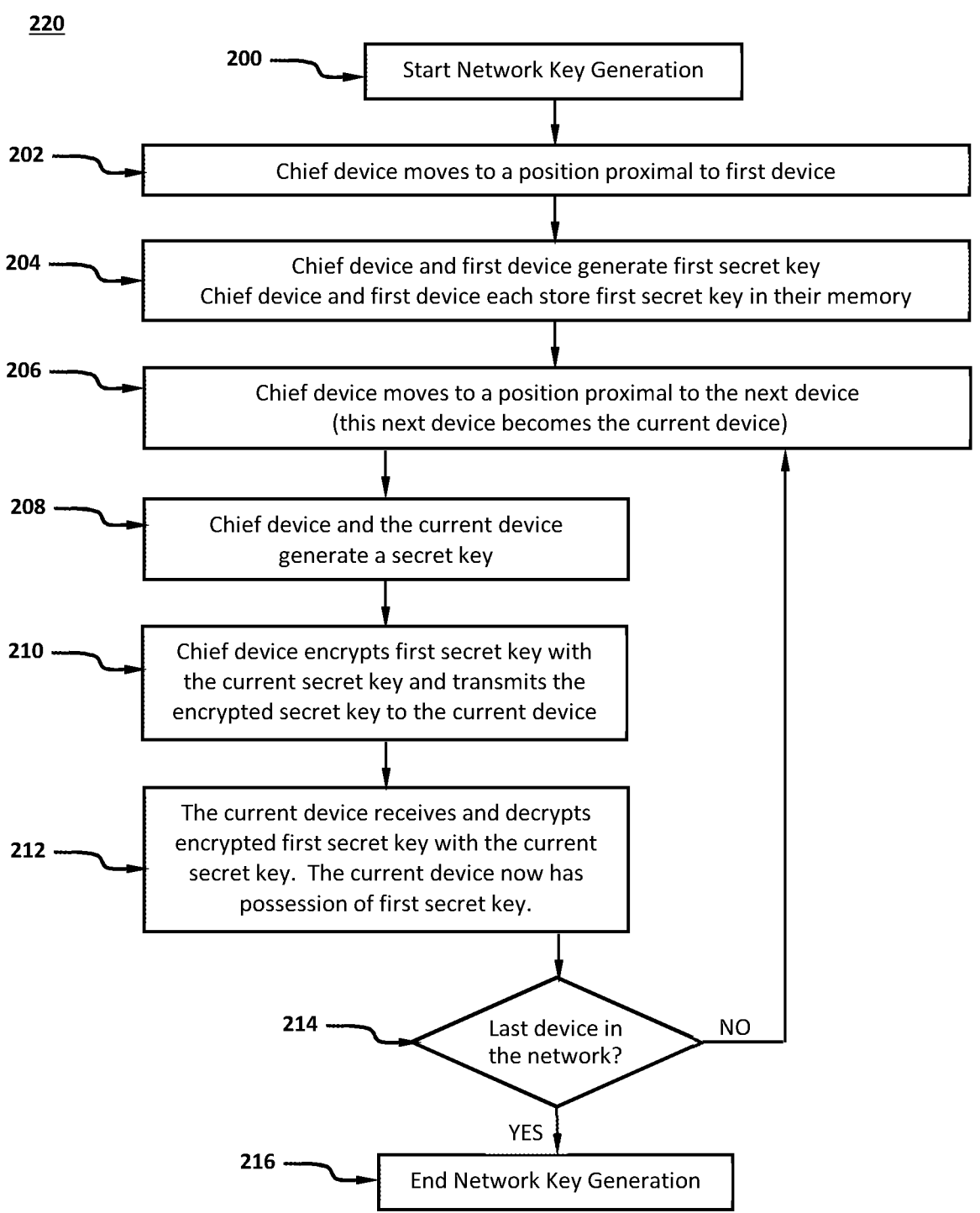

220

200 — Start Network Key Generation

202 — Chief device moves to a position proximal to first device

204 — Chief device and first device generate first secret key
Chief device and first device each store first secret key in their memory 206 — Chief device moves to a position proximal to the next device
(this next device becomes the current device)

208 — Chief device and the current device
generate a secret key

210 — Chief device encrypts first secret key with
the current secret key and transmits the
encrypted secret key to the current device 212 — The current device receives and decrypts
encrypted first secret key with the current
secret key. The current device now has
possession of first secret key.

214 — Last device in
the network?          NO

YES

216 — End Network Key Generation

Figure 5

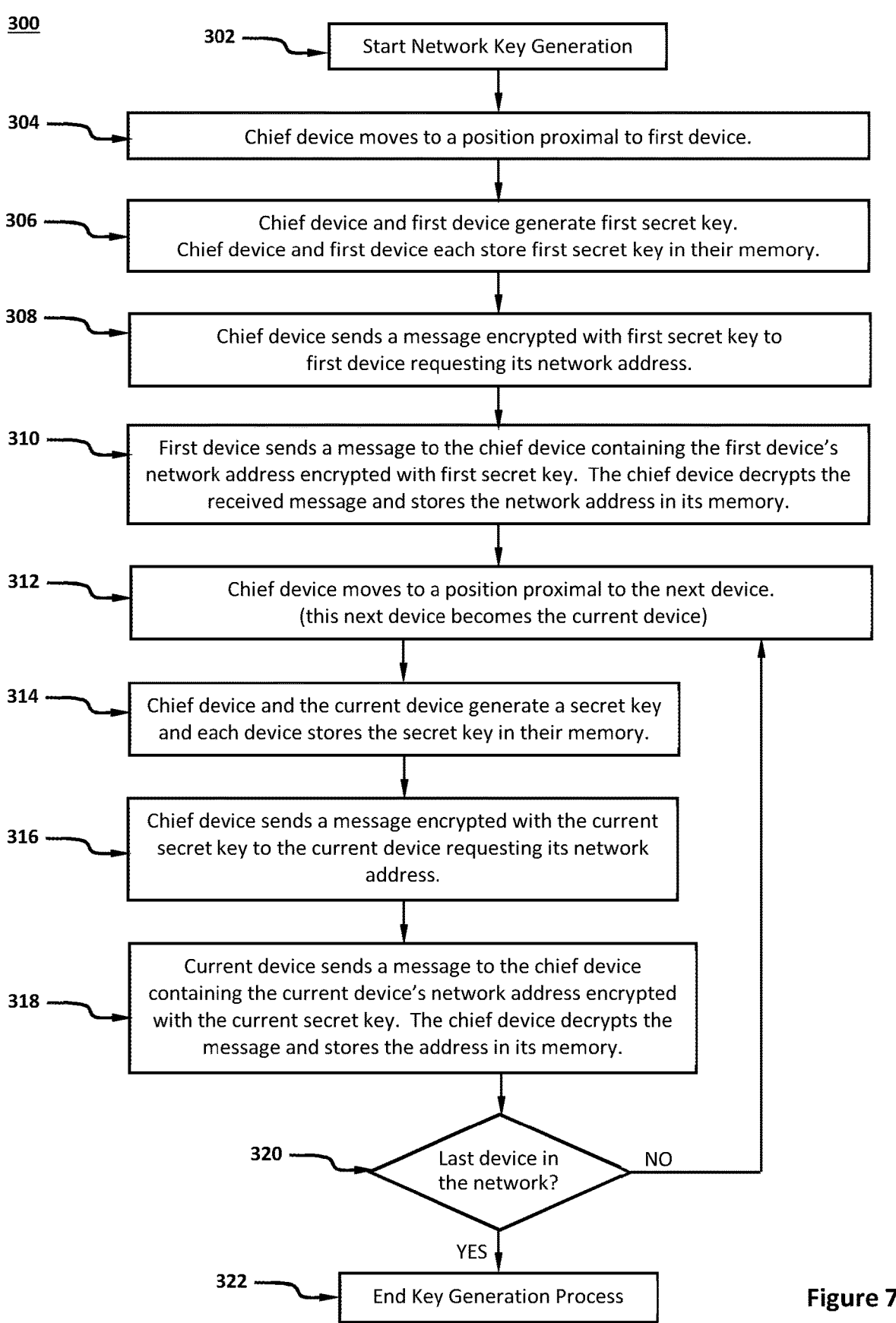

300

302 — Start Network Key Generation

304 — Chief device moves to a position proximal to first device.

306 — Chief device and first device generate first secret key.
Chief device and first device each store first secret key in their memory.

308 — Chief device sends a message encrypted with first secret key to
first device requesting its network address.

310 — First device sends a message to the chief device containing the first device's
network address encrypted with first secret key.  The chief device decrypts the
received message and stores the network address in its memory.

312 — Chief device moves to a position proximal to the next device.
(this next device becomes the current device)

314 — Chief device and the current device generate a secret key
and each device stores the secret key in their memory.

316 — Chief device sends a message encrypted with the current
secret key to the current device requesting its network
address.

318 — Current device sends a message to the chief device
containing the current device's network address encrypted
with the current secret key.  The chief device decrypts the
message and stores the address in its memory.

320 — Last device in
the network?        NO

YES

322 — End Key Generation Process

Figure 7

METHODS FOR CREATING SECRET KEYS WITH A CHIEF DEVICE AND SYSTEMS THEREOF

This application claims the benefit of U.S. Provisional Patent Application Ser. No. 63/294,187, filed Dec. 28, 2021, which is hereby incorporated by reference in its entirety.

FIELD

This technology generally relates to systems and methods for cryptographic communications and, more particularly, to systems and methods for securing multiple devices using a common secret key distributed to the devices with a trusted courier that is an integral component of the secret key generation process.

BACKGROUND

A recurring problem in symmetric cryptography is the distribution of secret keys. Secret keys are required for encryption and decryption of messages transmitted through an unsecure medium, such as an open wireless radio link or through the Internet. In electronic communications, secret keys are also used to provide a secure integrity check that ensures messages have not been modified during transmission. In addition, electronic communication systems also routinely use possession or knowledge of secret keys to demonstrate proof of identity (authentication).

Unfortunately, it is problematic to distribute a secret key through a communication channel before that communication channel has been secured. The paradox is that the communication channel cannot be secured until the secret key has been distributed—this is the "chicken and egg" problem for encryption systems. FIG. 1 illustrates a common prior art configuration of a key generation system 1, which includes a first device 2 possessing a secret private key 4, a second device 6 possessing a different secret private key 8, a public key repository 10 which possesses a publicly-known key for second device 6 and which also possesses a publicly-known key for first device 2. The system 1 can also possess an unsecure communication medium 12 through which first device 2 and second device 6 wish to communicate, the communication medium being potentially monitored by an eavesdropping device 14 ("Eve") by way of eavesdropping tap 16.

At the start of the secure communication process, first device 2 must receive second device's 6 public key from the public key repository 10 via open communication channel 20, and mathematically combine it with first device's 2 secret key 4 to generate a cryptographic key. Similarly, second device 6 must receive first device's 2 public key from the public key repository 10 via open communication channel 22, and mathematically combine it with second device's 6 secret key 8 to generate a cryptographic key, which has the same value as the cryptographic key generated at first device 2. First device 2 and second device 6 can then encrypt and transmit data through unsecure medium 12 having an eavesdropping tap 16 and eavesdropping device 14 without fear that eavesdropping device 14 will be able to decrypt the encrypted data.

Public-key cryptography solves the initial key distribution problem that plague symmetric encryption algorithms, but the algorithms used for public-key cryptography are computationally intensive and are now becoming susceptible to being hacked or broken with quantum computing methods. That is, most of these public-key algorithms rely upon the infeasibility of performing some types of mathematical operations, such as computing the discrete logarithm of a very large number containing hundreds of digits. In other words, the strength of the key agreement algorithm rests upon the assumption that it is computationally infeasible for an attacker, such as eavesdropping device 14, to bypass the algorithm. But unfortunately, these methods can be hacked or broken with quantum computing methods.

One approach for secret key generation that appears to be quantum proof is disclosed in U.S. Pat. No. 8,320,562, which is hereby included by reference in its entirety, in which a swiping motion of a mobile device past a fixed device is measured concurrently by both devices, and a table of floating-point distance values, or values denoting a change in distance, as a function of time are generated, truncated to an integer data type, converted to binary, and then a set of bits are selected from the binary values for use as the secret keys. Note that since each of the mobile and fixed devices measures the same swipe profile at the same time, each device can independently arrive at the same sequence of key bits based on the motion or swipe profile.

However, with this approach, it has been discovered that random noise in the key generation process can cause a low-order (non-key) bit to change its value, and under the right circumstances the value changes can propagate to higher-order bits and cause their values to change as well. Indeed, under some conditions the low-order noise can ripple upward and cause a key-bit to change at one device, but not at the other device, thereby causing the keys generated at the devices to not match. Accordingly, US Patent Application Publication No. 2021/0203499 describes a method for overcoming this limitation and is also included herein by reference in its entirety. Furthermore, methods for signal processing within the devices is taught in US Patent Application Publication No. 2013/0236007 which is also included herein by reference in its entirety.

Nonetheless, while important, this body of prior art work is limited to the generation of secret keys at two devices that directly measure a common gap between them, or other common physical parameter. Additionally, this prior art work is silent on how the key-generation technology can be applied to more than two devices. This prior art work also is silent on how the key-generation technology can be adapted to generate secret keys at devices that are not proximal to one another and do not share a common gap with one another. Further, this prior art work is silent on how a non-fixed device can be used for both generating secret keys at a plurality of devices as well as utilizing those generated secret keys to communicate securely with those devices through the internet in a so-called internet of things (IoT) configuration.

According to Wikipedia, the "Internet of Things describes physical objects (or groups of objects) that are embedded with sensors, processing ability, software, and other technologies that connect and exchange data with other devices and systems over the internet or other communication networks". Hereinafter these IoT devices will be referred to as "IoT communication devices" or just "devices". Unfortunately, currently communications by IoT communication devices through the internet, or through radio communications such as Wi-Fi and Bluetooth, are unsecured, or are anticipated to be decryptable with quantum computing methods, meaning that their communications can be intercepted and deciphered, or worse the IoT devices can be controlled by nefarious actors to perform malicious operations.

SUMMARY

A secure communication system includes a chief device comprising a motion detection system coupled to a memory comprising programmed instructions stored thereon and one or more processors. The one or more processors are configured to be capable of executing the stored programmed instructions to: generate a secret key based upon relative motion detected by the motion detection system between the chief device and each of a corresponding one of a plurality of communication devices initiating a secure communication, wherein the generated secret key between each pair of the chief device and each of the corresponding one of the communication devices initiating the secure communication is different and matches a corresponding secret key generated at the corresponding one of the communication devices generated based on the relative motion between the chief device and the corresponding one of the plurality of communication devices; and transmit one of the generated secret keys for one of the communication devices initiating the secure communication to another one of the communication devices at least partially encrypted with the generated secret key for the another one of the communication devices to enable the secure communication with the one of the generated secret keys between the one of the communication devices and the another one of the communication devices.

A method for making a secure communication system includes providing a chief device comprising a motion detection system coupled to a memory and one or more processors. Instructions are programmed in the memory, wherein the one or more processors are configured to be capable of executing the programmed instructions and wherein the programmed instructions further comprises the instructions to: generate a secret key based upon relative motion detected by the motion detection system between the chief device and each of a corresponding one of a plurality of communication devices initiating a secure communication, wherein the generated secret key between each pair of the chief device and each of the corresponding one of the communication devices initiating the secure communication is different and matches a corresponding secret key generated at the corresponding one of the communication devices generated based on the relative motion between the chief device and the corresponding one of the plurality of communication devices; and transmit one of the generated secret keys for one of the communication devices initiating the secure communication to another one of the communication devices at least partially encrypted with the generated secret key for the another one of the communication devices to enable the secure communication with the one of the generated secret keys between the one of the communication devices and the another one of the communication devices.

Accordingly, examples of this technology also include a system for independently generating identical secret keys at two or more devices that may not be in close proximity with one another, the system comprising two or more devices in need of the identical secret key for which the two or more devices can communicate encrypted data to one another, and a chief device, wherein the chief device and a first device generate a first secret key based upon the relative motion between the chief device and the first device and wherein the chief device and the second device generate a second secret key based upon the relative motion between the chief device and the second device and wherein after the second secret key has been generated the chief device transmits the first secret key to the second device encrypted with the second secret key whereupon second device decrypts the transmission with its second secret key such that both the first and second devices identically possess the same first secret key.

A system for independently generating identical secret keys at a plurality of devices, the system comprising a plurality of devices in need of the identical secret key for which the devices can communicate encrypted data to one another and a chief device wherein the chief device and a first device generate a first secret key based upon the relative motion between the chief device and the first device and wherein for each of the remaining plurality of devices the chief device and one of the plurality of devices generate a new secret key based upon the relative motion between the chief device and the one of the plurality of devices and after the new secret key has been generated the chief device transmits the first secret key to the one of the plurality of devices encrypted with the new secret key such that both devices also identically possess the same first secret key wherein after all devices of the plurality of devices identically possess the first secret key.

A system for independently generating identical secret keys at a plurality of devices and communicating securely through a network with those keys comprising a mobile chief device, a plurality of devices, and at least one internet router connected to the internet and in communication with the plurality of devices, wherein the chief device and each of the plurality of devices generate secret keys based upon the relative motion between the chief device and each device of the plurality of devices and wherein after each new secret key has been generated the chief device and each device identically possess and retain a secret key to facilitate secure communications through the internet via the router connected to the internet.

The devices comprising each aforementioned system can be Internet of Things devices found in different settings, such as for example, a household setting where the devices may comprise one or more smart door lock, smart door-bell, fire detector, motion detector, smart baby monitor, security camera, home security system, home heating or HVAC system, home lighting control system, or a vehicle, and the chief device can be a smart-phone. An alternate setting can be in a hospital in which the devices can be one or more infusion pumps, respirators, monitors, etc., and the chief device can be a smart-phone or similarly equipped mobile device. An alternate setting can be the human body in which the devices can be one or more pacemakers, implanted blood analyzer, oxygen sensor, or an otherwise wearable or implantable device and the chief device can be a smart-phone, smart watch, or similarly equipped mobile device. Yet another setting can be a factory wherein the devices may comprise one or more smoke alarms, motion detectors, access control systems, security cameras, and the chief device can be a smart-phone. Yet another setting can be a vehicle, autonomous or otherwise, and the devices may comprise one or more door locks, ignition, remote start, lights, navigation system or navigation system sensors, and telematic devices.

BRIEF DESCRIPTION OF THE DRAWINGS

FIG. 3 is a flowchart of an example of a method for generating and managing secret keys at two devices with the aid of a chief device;

FIG. 5 is a flowchart of another example of a method for generating and managing secret keys at three or more devices with the aid of a chief device;

FIG. 7 is a flowchart of another example of a method for generating secret keys at a plurality of devices with the aid of an exemplary chief device in which the devices possess addresses;

DETAILED DESCRIPTION

Secure Communications Between Two Devices

Figure 1:
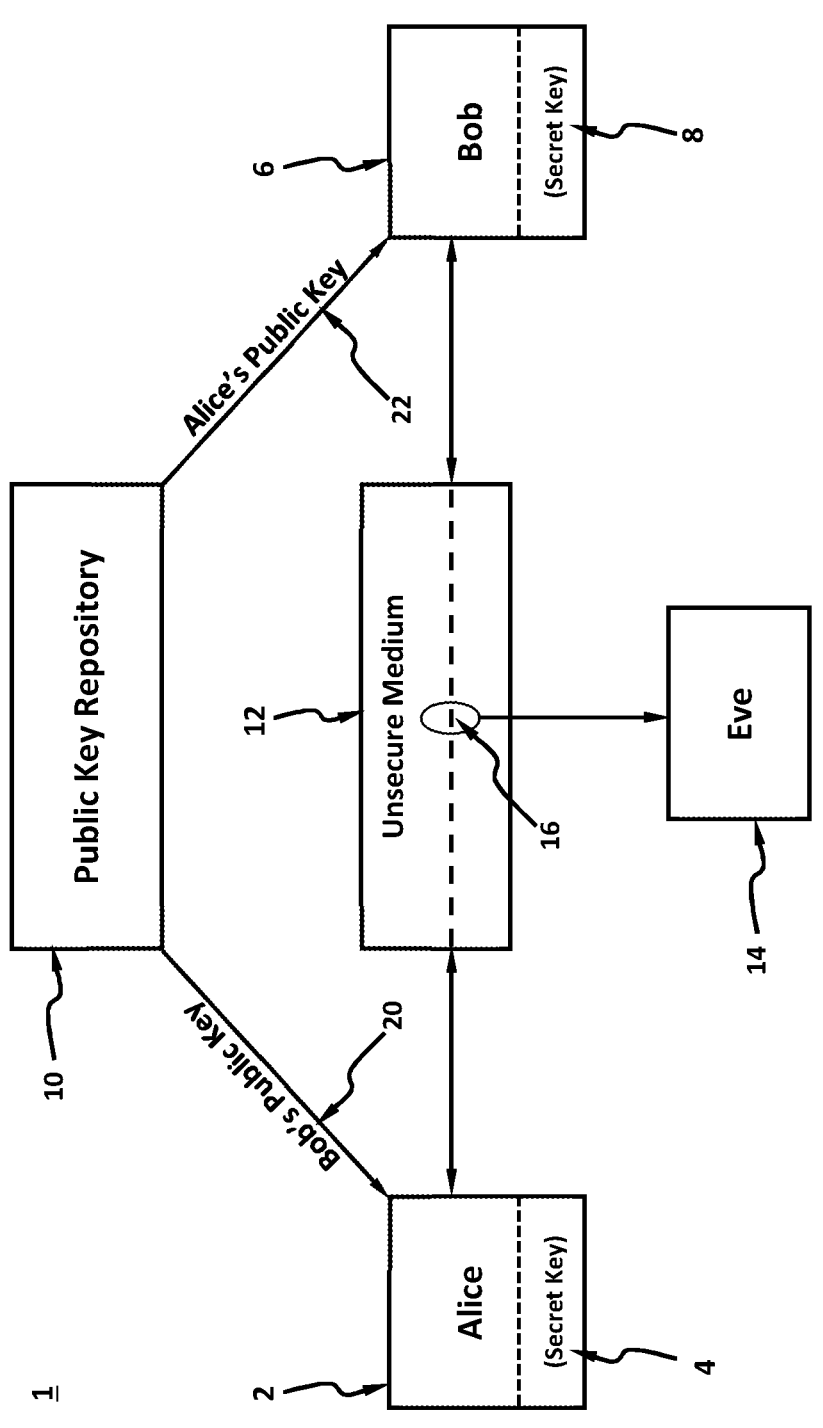
FIG. 1 is a partial block and partial functional diagram of a prior art system for generating secret keys at two devices.
Figure 2:
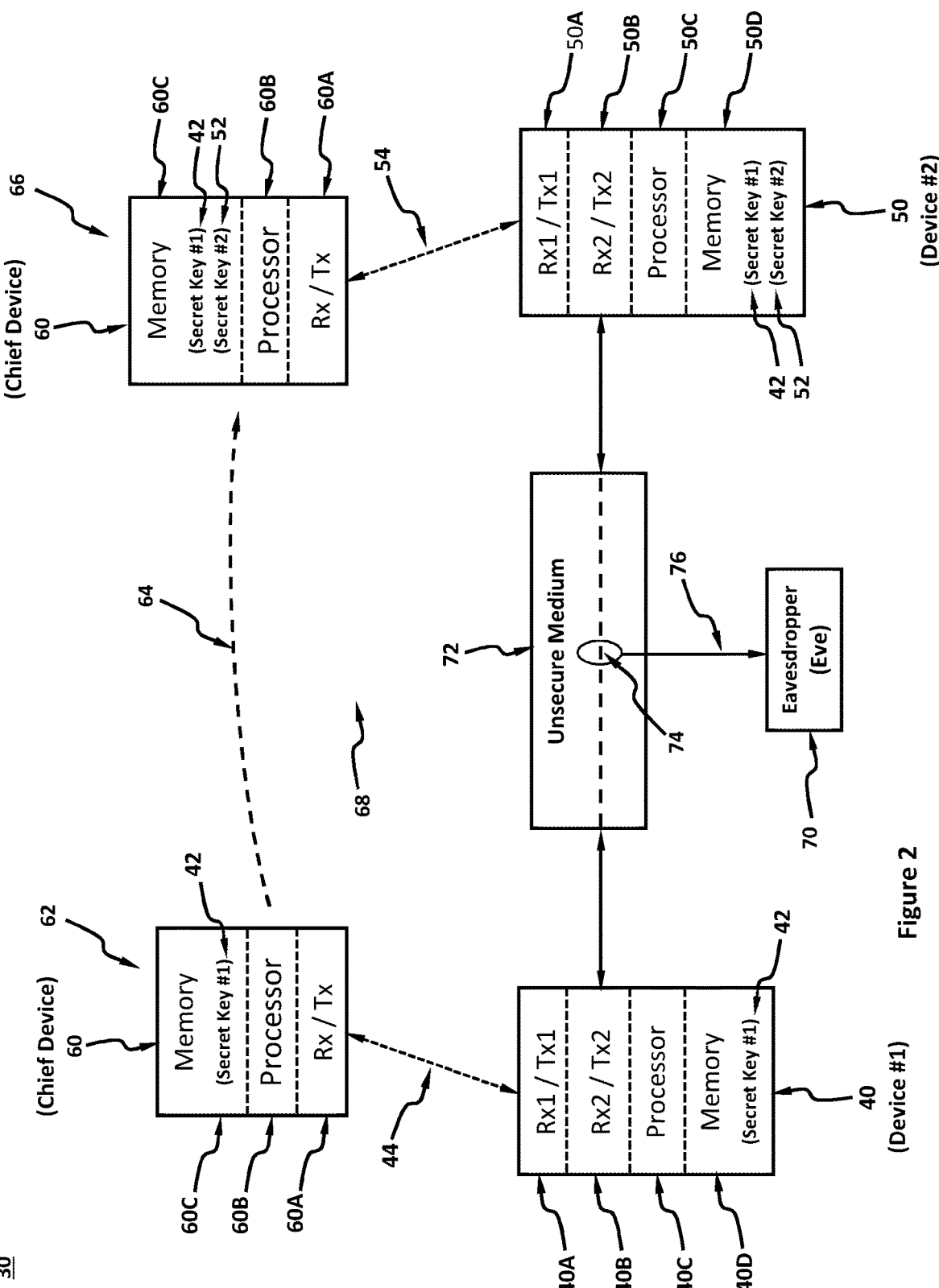
FIG. 2 is a partial block and partial functional diagram of an example of a system configured to generate and manage secret keys at two devices with the aid of a chief device.

A system 30 for generating one or more secret keys in accordance with examples of this technology is illustrated in FIG. 2. The system 30 includes a first device 40, a second device 50, an unsecure communication medium 72 that first device 40 and second device 50, also referred to as communication devices, can communicate through, and a mobile chief device 60 shown moving from a first location to a second location in this example, although the system could comprise other types and/or numbers of other systems, devices, components, and/or other elements in other configurations. Note in this example that an eavesdropping device 70 may also be present in the system 30 wherein the eavesdropping device 70 can monitor communications in unsecure medium 72 by way of eavesdropping tap 74 and eavesdropping signal path 76. Additionally, when chief device 60 is proximal to first device 40, such as at first chief position 62, a signal path 44 can be formed between first device 40 and chief device 60 through which first device 40 and chief device 60 can communicate signals with one another. Similarly, when chief device 60 is proximal to second device 50, such as at second chief location 66, a signal path 54 can be formed between second device 50 and chief device 60 through which second device 50 and chief device 60 can communicate signals with one another.

First device 40 is an electronic device with a processor 40C, memory 40D, first transmitter and receiver 40A, second transmitter and receiver 40B, and a motion detection system which are all coupled together by one or more communication links or busses, although the first device 40 may comprise other types and/or numbers of other systems, devices, components, and/or other elements in other configurations, such as the second transmitter and receiver 40B can be excluded and their respective functions performed by first receiver and transmitter 40A by way of example only. First transmitter and receiver 40A can be configured to conform to any necessary communication standard, such as the Bluetooth communication standard or to the Wi-Fi communication standard by way of example. Alternately first transmitter and receiver 40A can be optical wherein the receiver is a photodiode and the transmitter is an LED (light emitting diode), SLED (super luminescent light emitting diode), a diode laser or even a VCSEL (vertical cavity surface emitting laser). Similarly, second transmitter and receiver 40B, if present, can be configured to conform to any necessary communication standard, such as the Bluetooth communication standard or to the Wi-Fi communication standard by way of example. Alternately second transmitter and receiver 40B can be optical wherein the receiver is a photodiode and the transmitter is an LED, SLED, diode laser, or a VCSEL. The processor 40C is configured to be capable of executing the stored programmed instructions in the memory 40D to, in this example: a) control the first transmitter and receiver 40A, b) coordinate signal communication activities with chief device 60, c) generate a corresponding first secret key 42, d) control second transmitter and receiver 40B, e) coordinate communications with second device 50, f) process data that is sent to and received from second device 50, g) encrypt data that is to be transmitted through unsecure medium 72 to second device 50, h) decrypt data that is received from second device 50 through unsecure medium 72, i) manage memory 40D within first device 40 in which the first secret encryption key 42 is stored, and j) manage the interface, such as a display and keypad, to a user, although the processor may perform other types and/or numbers of other functions and operations, such as those illustrated and described by way of the examples herein.

In this example, the first transmitter and first receiver in the first device 40 are for communicating signals with chief device 60 and the second transmitter and second receiver in the first device 40 are for communicating with second device 50 through unsecure medium 72 in this example, although first and second transmitters may be combined into a single transmitter and first and second receivers may be combined into a single receiver, especially if signal path 44 is the same as, or at least partially overlaps with, for example unsecure medium 72.

In this example, the motion detection system in the first device 40 comprises first transmitter and receiver 40A, processor 40C, and memory 40D working in concert to detect, and process, the motion of first device 40 with respect to chief device 60 (or vice versa). One way to detect the relative motion between first device 40 and chief device 60 is to measure the gap or distance between them along signal path 44. There are many ways prescribed in the scientific and patent literature to measure such a gap, but one approach as described in U.S. Pat. No. 8,320,562 is particularly useful for examples of this technology. As described in U.S. Pat. No. 8,320,562, under the control of a processor, such as processor 40C (which in turn is following programmed instructions residing in memory 40C), a transmitter, such as the transmitter of transmitter/receiver pair 40A, transmits a sinusoidally modulated electromagnetic signal through a gap between the devices, such as through signal path 44, whereupon a portion of the sinusoidally modulated signal is reflected from the opposing device, such as a chief device 60, and a portion of the reflected signal is received by a receiver, such as the receiver of transmitter/receiver pair 40A. The receiver in turn amplifies the received reflected signal, optionally demodulates or down-converts the signal to a lower frequency, converts the signal to a digital format and outputs the digitized received signal to a processor, such as processor 40C for processing per the programmed instruction contained in memory such as memory 40D. The processor, such as digital processor 40C then performs signal processing operations on the digitized signal, such as Fourier Transform processing, to extract a parameter from the signal, such as its phase. The phase of the reflected, received, and processed signal is indicative of the round-trip time of the signal to the opposing device and back. As such if the processor, such as processor 40C, determines that the phase of the signal changes over time, then the gap between the two devices has also changed over time which can only occur if one of the devices is in motion with respect to the other device in which case the processor, such as processor 40C, has detected a motion between the two devices.

First device 40 can be stationary or first device 40 can be mobile, portable, or otherwise not fixed in position. First device 40 can for example be a mobile phone, handset, or a smart-phone, or first device 40 can be a personal computer such as a desktop PC, a laptop PC, or a tablet PC. First device 40 can also for example be a terminal, such as a point of sale terminal or a device incorporating a point of sale terminal, a bar-code scanner, a cash register, an Automated Teller Machine (ATM), or any device that has a need to transmit and/or receive data securely through an unsecure medium 72. Alternately first device 40 can also in other examples be any one of a number of Internet-of-Things devices as described below.

Second device 50 is an electronic device with a processor 50C, memory 50D, first transmitter and receiver 50A, second transmitter and receiver 50B, and a motion detection system which are all coupled together by one or more communication links or busses, although the second device may comprise other types and/or numbers of other systems, devices, components, and/or other elements in other configurations, and the second transmitter and receiver 50B can be excluded and their respective functions performed by first transmitter and receiver 50A. First transmitter and receiver 50A can be configured to any necessary communication standard, such as conform to the Bluetooth communication standard or to the Wi-Fi communication standard by way of example. Alternately first transmitter and receiver 50A can be optical wherein the receiver is a photodiode and the transmitter is an LED, SLED, diode laser, or a VCSEL. Similarly, second transmitter and receiver 50B, if present, can be configured to conform to any necessary communication standard, such as the Bluetooth communication standard or to the Wi-Fi communication standard by way of example. Alternately second transmitter and receiver 50B can be optical wherein the receiver is a photodiode and the transmitter is an LED, SLED, diode laser, or a VCSEL. The processor 50C is configured to be capable of executing the stored programmed instructions in the memory 50D to, in this example: a) controlling its first transmitter and receiver 50A, b) coordinate signal communication activities with chief device 60, c) generate a corresponding second secret key 52, d) decrypt the first secret key 42, e) control second transmitter and receiver 50B, f) coordinate communications with first device 40, g) process data that is sent to and received from first device 40, h) encrypt data that is to be transmitted through unsecure medium 72 to first device 40, i) decrypt data that is received from first device 40 through unsecure medium 72, j) manage memory 50D within second device 50 in which the first second secret key 42 and second secret keys 52 are stored, and k) manage the interface, such as a display and keypad, to a user, although the processor may perform other types and/or numbers of other functions and operations, such as those illustrated and described by way of the examples herein.

In this example, the first transmitter and receiver 50A in the second device 50 are for communicating signals with chief device 60 and the second transmitter and receiver 50B in the second device 50 are for communicating with first device 40 through unsecure medium 72, although first and second transmitters may be combined into a single transmitter and first and second receivers may be combined into a single receiver, especially if signal path 54 is the same as, or at least partially overlaps with, unsecure medium 72.

In this example, the motion detection system in the second device 50 comprises first transmitter and receiver 50A, processor 50C, and memory 50D working in concert to detect, and process, the motion of second device 50 with respect to chief device 60 (or vice versa). One way to detect the relative motion of the second device 50 and chief device 60 is to measure the gap or distance between them along signal path 54. There are many ways prescribed in the scientific and patent literature to measure such a gap, but one approach as described in U.S. Pat. No. 8,320,562 is particularly useful for examples of this technology. As described in U.S. Pat. No. 8,320,562, under the control of a processor, such as processor 50C (which in turn is following programmed instructions residing in memory 50D), a transmitter, such as the transmitter of transmitter/receiver pair 50A, transmits a sinusoidally modulated electromagnetic signal through the space between the devices, such as through signal path 54, whereupon a portion of the sinusoidally modulated signal is reflected from the opposing device, such as a chief device 60, and a portion of the reflected signal is received by a receiver, such as the receiver of transmitter/receiver pair 50A. The receiver in turn amplifies the received reflected signal, optionally demodulates or down-converts the signal to a lower frequency, converts the signal to a digital format and outputs the digitized received signal to a processor, such as processor 50C, for processing per the programmed instruction contained in memory such as memory 50D. The processor, such as digital processor 50C, then performs signal processing operations on the digitized signal, such as Fourier Transform processing, to extract a parameter from the signal, such as its phase. The phase of the reflected, received, and processed signal is indicative of the round-trip time of the signal to the opposing device and back. As such if the processor, such as processor 50C, determines that the phase of the signal changes over time, then the gap between the two devices has also changed over time which can only occur if one of the devices is in motion with respect to the other device in which case the processor, such as processor 50C, has detected a motion between the two devices.

Second device 50 can be stationary or second device 50 can be mobile, portable, or otherwise not fixed in position. Second device 50 can be a mobile phone, handset, or a smart-phone, or second device 50 can be a personal computer, such as a desktop PC, a laptop PC, or a tablet PC. Second device 50 can be a terminal, such as a point of sale terminal or a device incorporating a point of sale terminal, a bar-code scanner, a cash register, an Automated Teller Machine (ATM), or any device that has a need to transmit and/or receive data securely through and/or from an unsecure medium 72. Alternately second device 50 can also be any one of a number of Internet-of-Things devices as described below.

Chief device 60 is an electronic device with a processor 60B, memory 60C, a transmitter and receiver 60A, and a motion detection system which are all coupled together by one or more communication links or busses, although the chief device 60 may comprise other types and/or numbers of other systems, devices, components, and/or other elements in other configurations. Transmitter and receiver 60A can be configured to conform to any necessary communication standard, such as the Bluetooth communication standard or to the Wi-Fi communication standard by way of example. Alternately transmitter and receiver 60A can be optical wherein the receiver is a photodiode and the transmitter is an LED, SLED, diode laser, or a VCSEL. The processor 60B is configured to be capable of executing the stored programmed instructions in memory 60C to, in this example: a) control the transmitter and receiver 60A, b) coordinate signal communications with first device 40, c) generate a first secret key 42, d) coordinate signal communications with second device 50, e) generate a second secret key 52, f) encrypt first secret key 42 with the second secret key 52 or encrypt second secret key 52 with the first secret key 42, g) control the transmitter of the transmitter receiver pair 60A so that it transmits the encrypted first secret key 42 to the second device 50 or the encrypted second secret key 52 to the first device 40, h) manage memory 60C within chief device 60 in which the first secret key 42 and the second secret key 52 are stored, and i) manage the interface, such as a display and keypad, to a user, although the processor 60B may perform other types and/or numbers of other functions and operations, such as those illustrated and described by way of the examples herein.

The transmitter and receiver 60A in the chief device 60 are for communicating with a first device 40 and for communicating with a second device 50. Chief device 60 can also have provisions for sending data into, and receiving data from, the internet such as a second radio transmitter and second radio receiver, although it may be possible to combine the two radio transmitters into a single radio transmitter, and also combine the two radio receivers into a single radio receiver.

Chief device 60 can be mobile, portable, or otherwise not fixed in position. Chief device 60 can be a handheld device, such as a mobile phone, handset, or a smart-phone, or chief device 60 can be a portable personal computer, such as a laptop PC or a tablet PC by way of example. Alternately chief device 60 can be an aerial device such as a drone, a missile, a manned or unmanned aircraft such as plane or helicopter, or even a space vehicle such as a satellite. Alternately chief device 60 can be an underwater device such as a submersible, or a manned or an unmanned underwater vehicle.

Chief device 60 is located within a surrounding medium 68 through which chief device 60 can move. Surrounding medium 68 can, for example, be a fluid, a liquid, air, water, seawater, space or vacuum, or any portion of an atmosphere. Chief device 60 can be free to move along path 64 within surrounding medium 68, and the movement of chief device 60 along path 64 can be caused to happen by any one of several factors including a) a propulsion system of the chief device 60, b) an external force acting on the chief device 60, such as gravity or wind resistance, c) inertia, or d) in the case in which chief device 60 is a handheld device, by the motion of a hand holding the chief device 60. Chief device 60, is a generator and courier of information (namely first secret key 42) that can be entrusted with that information by first device 40 and second device 50, such that the information will not be divulged to an eavesdropper or a hostile third party such as eavesdropping device 70.

Note that surrounding medium 68 can itself be an unsecure medium, and eavesdroppers can intercept signals transmitted by chief device 60 as well as first device 40 and second device 50. That is, surrounding medium 68 can be an unsecure communication medium 72. Therefore, it is important that all three devices do not transmit open, clear, or otherwise unencrypted data into or through surrounding medium 68 (during the key generation process and/or during the course of normal data communications), and indeed, a benefit provided by examples of this technology is that there is no need to transmit open, clear, or otherwise unencrypted data into or through surrounding medium 68 in order to generate and manage secret identical keys, such as first secret key 42 and second secret key 52, at the two or more devices such as first device 40 and second device 50.

However, while unencrypted data is not transmitted into or through surrounding medium 68, signals that do not convey digital data are transmitted into surrounding medium 68 by the first communication device 40, second communication device 50, and chief device 60 as part of the key-generation process. Specifically, signaling between chief device 60 and first communication device 40 along first device signal path 44 within surrounding medium 68 is required for generation of first secret key 42 as described, for example, in US Patent Application Publication Nos. 2013/0236007 and 2021/0203499 and U.S. Pat. No. 8,320,562. Further, signaling between chief device 60 and second device 50 along second device signal path 54 within surrounding medium 68 are required for generation of second secret key 52 also as described, for example, in US Patent Application Publication Nos. 2013/0236007 and 2021/0203499 and U.S. Pat. No. 8,320,562. Signaling through first device signal path 44 and second device signal path 54 can be acoustic or even ultrasonic encompassing frequencies from 1 Hz up to 200 kHz. Alternately signaling through first device signal path 44 and second device signal path 54 can be with radio emissions, including carrier frequencies from 1 kHz up to 400 GHz. Signaling through first device signal path 44 and second device signal path 54 can be made with optical signals, including wavelengths from 100 nm up to 10 μm. The number of bits comprising a secret key used for securing communications between devices can range from two up to 1,000,000. The number of key bits is often equal to 2-to-the-Mth power where M is an integer (for example if M=10 then the number of bits in the secret key is 1024); M can range from four up to 128.

Figure 17:
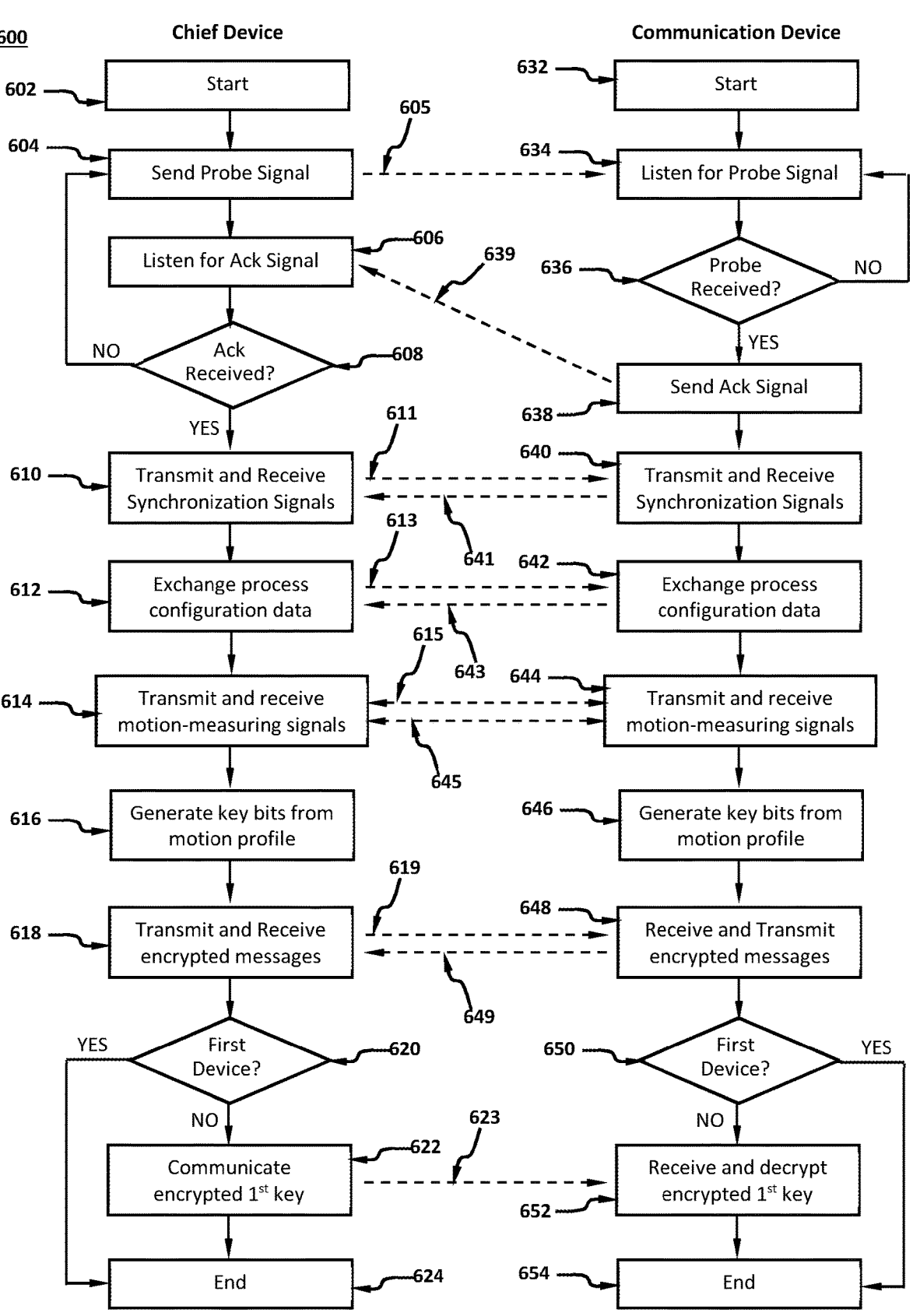
FIG. 17 is a flowchart of a process for generating common identical secret keys at a chief device and communication devices that are establishing a direct secure communication.

An exemplary method for generating a secret key at a chief device, such as chief device 60, and a communication device, such as first device 40, will now be described with reference to the flowchart of FIG. 17 and in this example is the same process in this example for another communication device, such as second device 50, which is attempting to establish a direct secure communication with the first device 40. As seen in FIG. 17, when a user wishes to generate a common secret encryption key at a chief device 60 in this example and a communication device 40 in this example, the process begins when the chief device 60 enters the Start process step 602 and the communication device 40 enters the Start process step 632. After entering the Start process step 602 processing immediately proceeds to Send Probe Signal step 604 for the chief device 60 and after entering the Start process step 632 processing immediately proceeds to Listen for Probe Signal step 634 for the communication device 40.

Next in step 604 the transmitter of the transmitter and receiver 60A of the chief device 60 transmits a probing signal 605 through a signal path, such as through first device signal path 44. After transmitting a probing signal 605 in step 604 for a period of time, such as 500 milliseconds, the transmission of the probing signal 605 terminates and execution proceeds to step 606. At the same time, in step 634, the receiver of the transmitter and receiver 40A of the communication device 40 listens for a probing signal 605 from a signal path such as signal path 44 for a period of time, such as 500 milliseconds, at which time execution proceeds to process step 636.

In step 636 the communication device 40 determines if a probing signal 605 was received during step 634, and if a probing signal 605 was not received then execution returns to process step 634; otherwise if a probing signal 605 was received then execution proceeds to process step 638.

In step 638 the communication device 40 transmits with the transmitter, such as the transmitter of the first transmitter and receiver 40A, an acknowledgement signal 639 into signal path 44 for a period of time, such as 500 milliseconds, before execution proceeds to process step 640.

Meanwhile, the chief device 60 is executing step 606 for a period of time, such as 500 milliseconds, in which the receiver, such as the receiver of transmitter and receiver 60A of the chief device 60, listens for an acknowledgement signal 639 before execution proceeds to step 608.

In step 608 the chief device 60 determines if an acknowledgement signal 639 was received during step 606, and if an acknowledgement signal 639 was not received then execution returns to process step 604; otherwise if an acknowledgement signal 639 was received then execution proceeds to process step 610. At this juncture the chief device 60 has entered step 610 and is aware of the presence of a communication device 40 and the communication device 40 has entered step 640 and is similarly aware of the presence of the chief device 60.

After entering step 610 chief device 60 begins the process of precisely synchronizing the key generation process of the chief device 60 with the key generation process of the communication device 40. The synchronization is required such that 1) both devices 40 and 60 are not transmitting signals into signal path at the same time as simultaneous transmissions from both devices 40 and 60 will disrupt the key generation process, and 2) to ensure that the swipe measurement process (described further in connection with process step 614 below) begins and ends at substantially the same time for each device. In step 610 the chief device 60 begins transmitting intermittent signals, namely synchronization signals 611, with the transmitter, such as the transmitter of transmitter and receiver 60A, wherein the synchronization transmission lasts, for example, for 100 milliseconds, followed by 150 ms of time in which there is no transmission, followed by another 100 milliseconds of transmission, and so on. The number of these periodic transmissions can be from two to 100. In step 610 the receiver of the chief device 60 can be disabled in which case the communication device 40 synchronizes on the synchronization signals 611 received from the chief device 60, or the receiver of the chief device 60 can be active in which case both devices 40 and 60 can actively participate in the synchronization process. At substantially the same time, in step 640 the receiver, such as the receiver of transmitter and receiver 40A, of the communication device 40 receives the synchronization signals 611 transmitted by the chief device 60, and analyzes the timing of the synchronization signals 611 such that the communication device 40 can accurately predict when the next synchronization signal transmission will arrive and therefore predict when the chief device 60 will be transmitting next. Once the timing analysis is complete and the communication device 40 is able to predict the chief device's transmissions then the devices 40 and 60 are synchronized. Once synchronized the communication device 40 can optionally transmit an acknowledgement synchronization signal, or signals, 641 to the chief device 60. Once synchronized, execution for the chief device 60 proceeds to process step 612 and execution for the communication device proceeds to step 642.

In step 612 and step 642 digital data, in the form of modulated signals 613 transmitted by the chief device 60 and received by the communication device 40 and modulated signals 643 transmitted by the communication device 40 and received by the chief device 60, is exchanged between the chief device 60 and the communication device 40. The data exchanged during steps 612 and 642, which can be considered handshaking data, can include: 1) the number of key bits within the key that are to be generated, 2) key generation algorithm version number (to ensure backward compatibility as the algorithm evolves over time), 3) information about the chief device 60 such as its manufacturer and model number, 4) information about the communication device 40 such as its manufacturer and model number, 5) the number of devices in the secure network so far (if the number is zero, for example, then the key being generated can be first secret key 42; if the number is one then the key being generated can be second secret key 52), 6) signal processing data such as a scaling factor, and 7) any address information such as an IP address. Note the data communicated within process step 612 and step 642 are unencrypted and can therefore be intercepted by a third party and it is important that data that is intended to be secret is not transmitted by either device 40 or 60 during these process steps. After the data exchange sub-process of step 612 and step 642 is complete, execution then proceeds to step 614 for the chief device 60 and step 644 for the communication device 40.

As seen in step 614 of FIG. 17, chief device, such as chief device 60, then begins to transmit and receive ranging signals, such as ranging signal 615, with a transmitter and receiver, such as transmitter and receiver 60A, and the reflected received ranging signals are amplified and digitized within the receiver and stored in memory, such as memory 60C, within the chief device 60. Importantly, in this example the ranging signal 615 can be transmitted intermittently in an interleaved fashion with the ranging signal 645 transmitted by the communication device 40 such that only one of ranging signal 615 and ranging signal 645 is being transmitted at any one time so the signals do not interfere with one another and disrupt the key generation process. The duration of a ranging signal 615 transmission can be from 1 microsecond to 100 milliseconds, and the period of the intermittent cyclical transmissions of ranging signal 615 can be from 2 microseconds to one second. The number of signal digitizations occurring within step 614 can be between 128 and $2^{64}$. Importantly, in this example during step 614 the distance, or gap, between the chief device 60 and the communication device 40 is varying in time over the duration of step 614. The changing gap between the two devices can occur, for example, by a user who is holding and moving the chief device, such as chief device 60, in such a manner that the chief device 60 moves in a swiping motion in air past or about the communication device 40 during step 614.

Also, as seen in step 644 of FIG. 17, a communication device, such as communication device 40, also transmits and receives ranging signals, such as ranging signal 645, with a transmitter and receiver, such as receiver and transmitter 40A, and the reflected and received ranging signals are amplified and digitized within the receiver and stored in memory, such as memory 40D within the communication device 40.

Importantly, in this example the ranging signal 645 can be transmitted intermittently in an interleaved fashion with the ranging signal 615 transmitted by the chief device 60 such that only one of ranging signal 645 and ranging signal 615 is being transmitted at any one time so the signals do not interfere with one another and disrupt the key generation process. The duration of a ranging signal 645 transmission can be from 1 microsecond to 100 milliseconds, and the period of the intermittent cyclical transmissions of ranging signal 645 can be from 2 microseconds to one second. The number of signal digitizations occurring within step 644 can be between 128 and $2^{\wedge}64$. Importantly, in this example the timing of ranging signal transmission 615 with respect to the timing of ranging signal transmission 645 was precisely established during the synchronization sub-processes of step 610 and step 640 described above so that only one of the two ranging signals is being transmitted at any one time.

After the completion of the transmissions, receptions, amplifications, and digitizations of ranging signals 615 and 645 within steps 614 and 644, execution then proceeds to step 616 for the chief device 60 and 646 for the communication device 40. In step 616 a processor, such as processor 60B, retrieves the digitized ranging signal data from memory, such as memory 60C, and processes the data to generate a digital representation of the swipe which occurred in step 614. The digital representation of the swipe can be a table of distance data (stored in memory, such as memory 60C) as a function of time or a table of changing distance data as a function of time (which one can be determined during the exchange of process configuration data during step 612). The processing of the data can include Fourier Transform processing, for example, in which the phase, or change in phase, of the received ranging signal 615 can be determined, from which the distance between the devices, or changes in distance between the devices 40 and 60, can be determined from the equation $$\Delta d = c\Delta\varphi/4\pi f$$

where $\Delta d$ is the change in distance in meters, c is the speed of light=300,000,000 meters/second, $\Delta\varphi$ is the phase or change in phase of the received ranging signal, and f is the frequency, or the modulation frequency, of the ranging signal 615. Values for the frequency, f, can be from 10,000 Hz up to 100 GHz. After the swipe table is constructed the floating-point valued entries of the swipe table can be scaled, for example, by multiplying all the entries by a constant such as 1,000,000, converting the scaled floating-point entries to an integer format, and then converting the integer values to binary. The binary table (or array) of swipe values can then be 24 bits across by the number of desired key bits in length. The binary data contained in one of the columns, such as a middling column 11, can be then selected as the sequence of secret key bits such as the bits that compose first secret key 42. Note that the binary data in higher order columns generally suffer from serial correlation and therefore are unsuitable for use as key bits; binary data in lower order columns will be noisy and generally will not match the same column of binary data generated in the opposing device (i.e., the keys will not match) and again these bits are unsuitable for use as key bits.

Similarly, in step 646 a processor, such as processor 40C, retrieves the digitized ranging signal data from memory, such as memory 40D, and processes the data to generate a digital representation of the swipe which occurred in step 644. The digital representation of the swipe can be a table of distance data as a function of time or a table of changing distance data as a function of time (which one can be determined during the exchange of process configuration data during step 642). The processing of the data can include Fourier Transform processing, for example, in which the phase, or change in phase, of the received ranging signal 645 can be determined, from which the distance between the devices, or changes in distance between the devices, can be determined from the equation $$\Delta d = c\Delta\varphi/4\pi f$$

where $\Delta d$ is the change in distance in meters, c is the speed of light=300,000,000 meters/second, $\Delta\varphi$ is the phase or change in phase of the received ranging signal, and f is the frequency, or the modulation frequency, of the ranging signal 645. Values for the frequency, f, can be from 10,000 Hz up to 100 GHz. After the swipe table is constructed the floating-point valued entries of the swipe table can be scaled, for example by multiplying all the entries by a constant such as 1,000,000, converting the scaled floating-point entries to an integer format, and then converting the integer values to binary. The binary table (or array) of swipe values can then be 24 bits across by the number of desired key bits in length. The binary data contained in one of the columns, such as a middling column 11, is then selected as the sequence of secret key bits such as the bits that compose first secret key 42. Note that the binary data in higher order columns generally suffer from serial correlation and therefore are unsuitable for use as key bits; binary data in lower order columns will be noisy and generally will not match the same column of binary data generated in the chief device 60 (i.e., the keys will not match) and again these bits are unsuitable for use as key bits.

Next in step 618, after the secret keys are generated in the chief device 60 at step 616 the chief device 60 can generate a test message and encrypt it with the secret key generated in step 616 and transmit the encrypted test message 619 to the communication device. After the secret keys are generated in the communication device 40 at step 646 the communication device 40 then proceeds to step 648 and listens for and receives an encrypted test message from the chief device 60. If the communication device, such as communication device 40, successfully receives and decrypts a test message from the chief device 60, then the communication device 40 in turn generates an acknowledging test message, encrypts it with the secret key generated in step 646, transmits the encrypted acknowledgement test message 649 to the chief device 60, and proceeds to step 650. If the chief device 60 successfully receives and decrypts the encrypted acknowledgement test message 649 in step 618 then processing for the chief device 60 proceeds to step 620.

Next in step 620, if a secure network of communication devices 40 and 50 is being assembled the chief device 60 then inspects the number of communication devices for which encryption keys have so far been generated. If the number is zero, then the newly generated secret key is the first key, such as first secret key 42, the communication device it belongs to is also the first device 40, the first secret key is stored in memory, such as memory 60C, and execution proceeds to step 624 where the key generation process terminates. If the number is greater than zero, then the newly generated secret key is not the first key, the communication device it belongs to is also not the first communication device 40, and the chief device 60 then encrypts the saved first key, such as secret key 42, with the newly generated key, such as secret key 52, transmits the encrypted first key 623 to the communication device 50 which is attempting to establish a secure communication with communication device 40, and then proceeds to step 624 whereupon the key generation process terminates at the chief device 60 if the necessary secret keys 42 and 52 to establish a secure communication between these devices have been generated, otherwise this exemplary process returns to the initial steps to generate for the other communication device(s) attempting to establish secure communications.

Similarly in step 650, if a secure network of communication devices 40 and 60 is being assembled the chief device 60 then inspects the number of communication devices 40 and 60 for which encryption keys have been generated (this data was received in step 642 and again this process is repeated in this example for each of the communication devices trying to establish secure communications, such as first device 40 and second device 50 in this example). If the number is zero, then the newly generated secret key is the first key, such as first secret key 42, the communication device is also the first device 40, the first secret key is stored in memory, such as memory 40D, and execution proceeds to step 654 where the key generation process terminates. If the number is greater than zero, then the newly generated secret key is not the first key, the communication device is also not the first communication device 40, and the communication device 50 listens for and receives the encrypted first key 623 from the chief device 60, decrypts the encrypted first key with the newly generated key, and stores the resulting first key, such as secret key 42, in memory 40D for later use. Execution then proceeds to step 654 whereupon the key generation process terminates at the communication device 40 or 50.

An exemplary method for generating a secret key at a first device 40 and a second device 50 by way of a chief device 60 will now be described with reference to FIG. 2 and to the flowchart of FIG. 3. When a user wishes to generate and manage secret and commonly possessed identical encryption keys at two communication devices so the two communication devices can communicate securely with one another, the chief device 60, under the guidance of a user who may have possession of the chief device 60, enters step 100 and begins the secret key generation process.

Next at step 102, in this example a chief device 60 moves or is moved proximal to first device 40, although in other examples the first device may move with respect to the chief device 60 or both the first device 40 and the chief device 60 may move with respect to each other. By way of example only, the distance between chief device 60 and first device 40 can be: a meter or less if the chief device 60 is a handheld device, between one meter; 100 meters if the chief device 60 is, for example, a drone; or more than 100 meters if the chief device 60 is, for example, an aircraft or is in space, although chief device 60 can be other types of devices as well.

Next in step 104, chief device 60 and first device 40 emit and receive signals, such as intermittent sinusoidal signals, through first device signal path 44, and chief device 60 and first device 40 synchronize their internal key generation processes with one another so that first secret key 42 can be identically generated at the chief device 60 and first device 40 in the following steps of the key generation process. The synchronization process is necessary to ensure that the transmitter of only one of the first device 40 and chief device 60 is active (i.e., transmitting) because if both were transmitting at the same time, especially at the same carrier frequency, then the transmitted signals could interfere with one another and disrupt the secret key generation process. To remedy this, only one of the transmitters of the first device 40 and chief device 60 are active at any one time, and to accomplish this a synchronization sub-process is required between the first device 40 and chief device 60. During synchronization, for example, the chief device 60 can transmit a signal to first device 40 through signal path 44 for a given duration, such as 100 milliseconds, and then terminate transmission for another given duration, such as 150 milliseconds, repeatedly, for at least two but less than 100 cycles or repetitions. During the repetitive transmissions from the chief device 60 the first device 40 is receiving the repetitive transmissions and making note of when they occur and, more importantly, in this example when they do not occur such that first 40 device can predict when the chief device 60 will be making a transmission. At the end of the synchronization, for example, the first device 40 will know when the transmission from the chief device will end, will then wait 25 milliseconds as a guard band, and then transmit its signal for 100 milliseconds. The chief device 60, following its prescribed pattern of signal transmission, will then wait another 25 milliseconds, for example, (as part of another guard band) before beginning its next transmission. In this example, therefore, at the end of the synchronization process the transmitter of each of the chief device 60 and first device 40 can alternatingly transmit for 100 milliseconds with 25 milliseconds of time there between in which neither device is transmitting, such that neither device is transmitting at the same time. Further, at the end of this temporal synchronization process, the chief device 60 and first device 40 can communicate handshaking information between them in which parameters relating to key generation process are exchanged and agreed upon by the two devices. The handshaking information can include, but is not limited to, the number of key bits to be generated, the protocol of the key generation process, the algorithm (or algorithm version) of the key generation process, and the number of devices already having possession of the first secret key 42.

In step 106, after the chief device 60 and first device 40 are synchronized in step 104, chief device 60 moves relative to first device 40 (and/or first device 40 moves relative to chief device 60 or both move with respect to each other). Additionally, during this time both chief device 60 and first device 40 emit and receive signals through first device signal path 44, and, in this example, as disclosed in accordance with the methods taught in U.S. Pat. No. 8,320,562 and US Patent Application Publication Nos. 2013/0236007 and 2021/0203499, which are each herein incorporated by reference in their entirety, both chief device 60 and first device 40 proceed to begin to generate identical secret keys based upon the detected relative motion between the chief device 60 and the first device 40.

As described in U.S. Pat. No. 8,320,562 and US Patent Application Publication Nos. 2013/0236007 and 2021/0203499, one way to generate the secret key bits for each of the two devices, namely chief device 60 and first device 40, is to cause one or both of the devices to move past one another in a swiping motion, and during the time of the swiping each device intermittently (so they do not both transmit at the same time as noted above) transmit and receive a sinusoidal signal. The signal transmitted by a device is reflected by the opposing device and received by the transmitting device, digitized and processed by the on-board processor to determine the signal's change in phase, and therefore the round-trip travel time, or change in travel time, of the signal. The digitized phase data can then be mathematically scaled by the processor, converted from a floating-point format to an integer format, optionally converted to a binary format, and a given bit of the binary or integer data selected as one of the bits composing the secret key. During the time when one device is not transmitting (and generating a key bit) the alternate device can be transmitting and generating a key bit. This cycle can continue until the requisite number of bits are generated at each device and stored in their respective memories. Importantly, in this example each motion or swipe profile of a device is unique and is well-suited to be the source of entropy for the key generation process. Further, the bit selected from the integer or binary data must be selected such that it is part of a measurably random sequence (i.e., it is not one of the most-significant bits of the data) and it must also be well above the noise level of the data (i.e., it is not one of the least-significant bits of the data)

In step 108, after a period of time has elapsed, such as one second or up to several seconds (the length of the first secret key 42 being generated being somewhat dependent upon the duration of this signaling in step 106), the chief device 60 and first device 40 both terminate their emissions to one another through first signal path 44.

Next in step 110, the chief device 60 and first device 40 continue to process the signals received from the opposing device through first signal path 44 and complete the same programmed instructions (or at least the same algorithm as decided upon during the handshaking portion, as discussed above, of the synchronization sub-process) for a secret key generation process in accordance, for example, with the methods taught in U.S. Pat. No. 8,320,562 and US Patent Application Publication Nos. 2013/0236007 and 2021/0203499, which are each herein incorporated by reference in their entirety. When the secret key generation process is complete at the chief device 60, then the chief device 60 stores the secret key, namely first secret key 42, in its memory. Similarly, when the secret key generation process is complete at the first device 40, the first device 40 stores its corresponding secret key, which is identical to the secret key 42 generated and stored in memory at the chief device 60, in its memory as well. Note again that at no time was secret key data sent between chief device 60 and first device 40 before, during, or after, the key generation process of steps 104 through 110. Note also that at no time was key data obtained from a repository as part of the key generation process as secret keys generated with public and private key data are susceptible to being broken by quantum computing methods.

Next at step 112, chief device 60 moves or is moved proximal to second device 50, such as at second chief location 66, via path 64, although the second device 60 could be moved towards the chief device 60 or both devices can be moved proximal to each other in other examples. By way of example only, the distance between chief device 60 and second device 50 can be: a meter or less if the chief device 60 is, for example, a handheld device, between one meter and 100 meters if the chief device 60 is, for example, a drone; or more than 100 meters if, for example, the chief device is an aircraft or is in space.

Next in step 114, chief device 60 and second device 50 emit and receive signals, such as intermittent sinusoidal signals, through second device signal path 54, and chief device 60 and second device 50 synchronize their internal key generation processes with one another so that second secret key 52 can be identically generated at the chief device 60 and second device 50 in the following steps of the key generation process. The synchronization process is necessary to ensure that the transmitter of only one of the second device 50 and chief device 60 is active (i.e., transmitting) because if both were transmitting at the same time, especially at the same carrier frequency, then the transmitted signals could interfere with one another and disrupt the secret key generation process. To remedy this, only one of the transmitters of the second device 50 and chief device 60 are active at any one time, and to accomplish this a synchronization sub-process is required between the second device 50 and chief device 60. During synchronization, for example, the chief device 60 can transmit a signal to second device 50 through signal path 54 for a given duration, such as 100 milliseconds, and then terminate transmission for another given duration, such as 150 milliseconds, repeatedly, for at least two but less than 100 cycles or repetitions. During the repetitive transmissions from the chief device 60 the second device 50 is receiving the repetitive transmissions and making note of when they occur and, more importantly, in this example when they do not occur such that second 50 device can predict when the chief device 60 will be making a transmission. At the end of the synchronization, for example, the second device 50 will know when the transmission from the chief device 60 will end, will then wait 25 milliseconds as a guard band, and then transmit its signal for 100 milliseconds. The chief device 60, following its prescribed pattern of signal transmission, will then wait another 25 milliseconds (as part of another guard band) before beginning its next transmission. In this example, therefore, at the end of the synchronization process the transmitter of each of the chief device 60 and second device 50 can alternatingly transmit for 100 milliseconds with 25 milliseconds of time there between in which neither device is transmitting, such that neither device is transmitting at the same time. Further, at the end of this temporal synchronization process, the chief device 60 and second device 50 can communicate handshaking information between them in which parameters relating to key generation process are exchanged and agreed upon by the two devices. The handshaking information can include, but is not limited to, the number of key bits to be generated, the protocol of the key generation process, the algorithm (or algorithm version) of the key generation process, and the number of devices already having possession of the first secret key 42.

In step 116, after the chief device 60 and second device 50 are synchronized in step 114, the chief device 60 moves relative to second device 50 (and/or second device 50 moves relative to chief device 60 or second device 50 and chief device 60 both move with respect to each other). Additionally, while both chief device 60 and second communication device 50 emit and receive signals through second device signal path 54, and in accordance, for example, with the methods taught in U.S. Pat. No. 8,320,562 and US Patent Application Publication Nos. 2013/0236007 and 2021/0203499, which are each herein incorporated by reference in their entirety, both chief device 60 and second device 50 proceed to begin to generate identical secret keys based upon the relative motion between the two devices.

In step 118, after a period of time has elapsed, such as one second or up to several seconds (the length of the secret key being generated being somewhat dependent upon the duration of the signaling of step 116), the chief device 60 and second device 50 both terminate their emissions to one another through second signal path 54.

Next in step 120, the chief device 60 and second device 50 continue to process the signals received from the opposing device through second signal path 54 and complete the same programmed instructions for a secret key generation process (or at least the same algorithm as decided upon during the handshaking portion, as discussed above, of the synchronization sub-process) in accordance, for example, with the methods taught in U.S. Pat. No. 8,320,562 and US Patent Application Publication Nos. 2013/0236007 and 2021/0203499, which are each herein incorporated by reference in their entirety. When the secret key generation process is complete at the chief device 60, then the chief device 60 stores the secret key, namely second secret key 52, in its memory. Similarly, when the secret key generation process is complete at the second device 50, the second device 50 stores its corresponding secret key, which is identical to the second secret key 52 generated and stored in memory at the chief device 60, in its memory as well. Note that at no time was key data sent between chief device 60 and second device 50 before, during, or after, the key generation process of steps 100 through 120.

Next in step 122, the processor within chief device 60 retrieves first secret key 42 from memory, as well as second secret key 52, and proceeds to encrypt the first secret key 42 with the second secret key 52 to produce encrypted first key. Chief device 60 then proceeds to transmit encrypted first key to second device 50 through second signal path 54. The data signal emission by the chief device 60 through second signal path 54 can be accomplished with the same emission hardware within chief device 60 as was used previously in step 116, or the emission can be performed with a different set of hardware wherein, for example, one set of hardware may conform to the Bluetooth standard and another set of hardware may conform to the Wi-Fi standard. Either way, after second device 50 receives the encrypted first key from the chief device 60, the processor within second device 50 retrieves the second secret key 52 from memory and uses retrieved second secret key 52 to decrypt the received encrypted first secret key thereby obtaining first secret key 42. The processor within second device 50 then stores first secret key 42 in the memory of second device 50. Note that now all three devices, first device 40, second device 50, and chief device 60, identically possess first secret key 42 which can be used to encrypt and decrypt data communicated amongst these devices and also for direct encrypted communication between device 40 and device 50 without any further involvement of chief device 60. At this point chief device 60 and second device 50 can discard second secret key 52 if it will no longer be needed. If chief device 60 is to share the first secret key 42 with additional communication devices, as discussed further in connection with examples in FIGS. 4 through 7, then chief device 60 must retain first secret key 42 in memory; otherwise chief device 60 can discard first secret key 42 and purge it from memory to reduce the chances of theft should chief device 60 be stolen, breached, hacked, or otherwise compromised by an adversary.

For reference, Bluetooth is a short-range wireless technology standard that is used for exchanging data between devices, such as fixed and mobile devices, over short distances using radio waves in the 2.402 GHz to 2.480 GHz band. In the most common mode of operation, transmission power is limited to 2.5 milliWatts, giving it a maximum range of about 10 meters. The Wi-Fi family of wireless network protocols, based on the IEEE 802.11 standards, are typically used for local area networking of devices and internet access, allowing nearby digital devices to exchange data by radio waves in the 2.4 GHz and 5.0 GHz bands, and generally have a maximum range of approximately 20 meters. Both Bluetooth and Wi-Fi signaling standards can be employed for communicating data, especially data encrypted by the methods taught in this disclosure, between the communicating devices, such as, for example, first device 40, second device 50, and chief device 60, through, for example, first signal path 44, second signal path 54, and unsecure communication medium 72.

Figure 4:
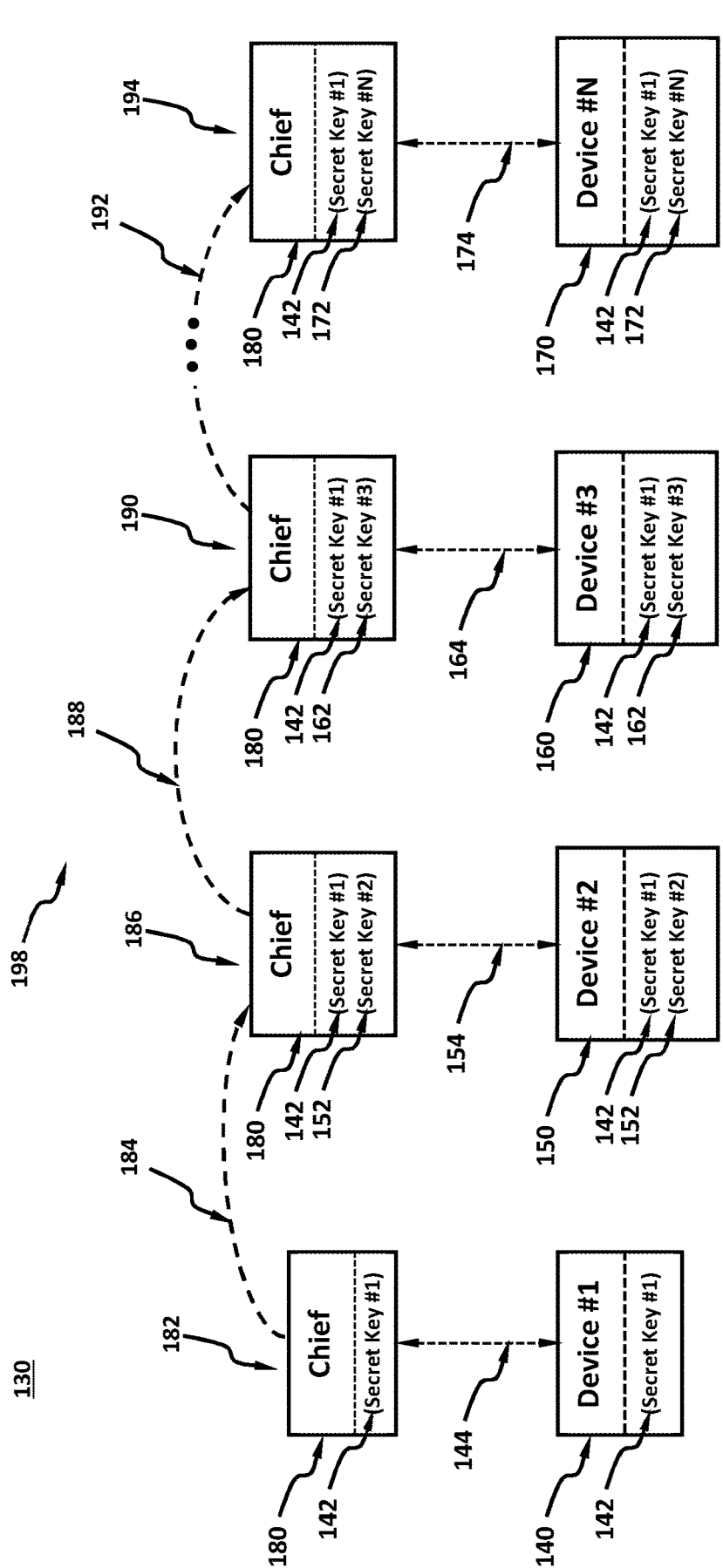
FIG. 4 is a partial block and partial functional diagram of another example of a system configured to generate and manage secret keys at three or more devices with the aid of a chief device.

Secure Communications Between More than Two Devices with a Single Common Secret Key An alternate communication system 130 in accordance with examples of this technology is illustrated in FIG. 4 in which a secret key is generated and caused to be identically shared with three or more devices in the system. In particular a first device 140, a second device 150, a third device 160, up to an Nth device 170 where N is an integer greater than two (if N=3 then third device 160 is also the Nth device 170), wish to communicate securely through an unsecure medium 198. Also included in communication system 130 is a chief device 180 which can move along first path 184, second path 188, up to Nth minus one path 192 as chief device 180 moves from one device to another within surrounding medium 198. Note that the number of devices, N, that wish to communicate securely with one another (i.e., that each identically possess a first secret key), can be from two to 1,000, or even up to 1,000,000.

In this example, a first device signal path 144 is available within surrounding medium 198 between the chief device 180 at location 182 and the first device 140; a second device signal path 154 is available within surrounding medium 198 between the chief 180 at location 186 and the second device 150; a third device signal path 164 is available within surrounding medium 198 between the chief device 180 at location 190 and the third device 160; up to an Nth device signal path 174 is available within surrounding medium 198 between the chief device 180 at location 194 and the Nth device 170. Note that surrounding medium 198 can itself be an unsecure medium and have hostile parties or signal taps that facilitate eavesdropping and interception of any signals emitted by the chief device 180 or any of the first device 140, second device 150, third device 160, and Nth device 170.

In this example, first device 140, second device 150, third device 160, up to Nth device 170 are the same as first device 40 and second device 50 described in connection with FIG. 2 and have an internal processor, memory, a transmitter and receiver for communicating through their respective signal path with the chief device 180, and a second transmitter and receiver for communicating with other devices, although the second transmitter/receiver pair can be the transmitter/receiver pair used for communicating with the chief device 180 through the signal path in the surrounding medium 198, although in other examples one or more of the first device 140, second device 150, third device 160, up to Nth device 170 can have other types and/or numbers of other systems, components, and/or elements in other configurations.

Similarly, in this example chief device 180 is the same as chief device 60 described in connection with FIG. 2, and has an internal processor, memory, and a transmitter/receiver pair for communicating with the first device 140, second device 150, third device 160, and Nth device 170 through their respective signaling paths within the surrounding medium 198, although in other examples the chief device can have other types and/or numbers of other systems, components, and/or elements in other configurations.

An example of a method for generating an identical secret key at more than two devices by way of chief device 180 such that a secure network is formed amongst the devices will now be described with reference to FIG. 4 and to the flowchart 220 of FIG. 5. This method shown and described with reference to FIGS. 4 and 5 is the same in structure and operation as the method shown in FIGS. 2 and 3, except as otherwise illustrated and described herein. When an operator (not shown) wishes to form a secure communication network amongst first device 140, second device 150, third device 160, and so on up to an Nth device 170, the process for generating a single common secret cryptographic key, namely first secret key 142, and securely distributing the common cryptographic key to all the devices and thereby forming a secure communication network amongst them, commences at step 200 and proceeds thereafter to step 202.

Next at step 202 a chief device 180 moves or is moved proximal to first device 140 such as at location 182. By way of example, the distance between chief device 180 and first device 140 can be: a meter or less if the chief device 180 is, for example, a handheld device; between one meter and 100 meters if the chief device 180 is, for example, a drone; or more than 100 meters if, for example, the chief device 180 is an aircraft or is in space.

Next in step 204, chief device 180 and first device 140 emit and receive signals, such as intermittent sinusoidal signals, through first signal path 144, and chief device 180 and first device 140 synchronize their internal key generation processes with one another so that first secret key 142 can be identically generated at the chief device 180 and first device 140 in the following steps of the key generation process.

Additionally in step 204, after the chief device 180 and first device 140 are synchronized, then chief device 180 moves or is caused to move relative to first device 140 (and/or first device 140 moves or is caused to move relative to chief device 180 or both move with respect to each other). Both chief device 180 and first device 140 also emit and receive signals through first device signal path 144, and in accordance, for example, with the methods taught in U.S. Pat. No. 8,320,562 and US Patent Application Publication Nos. 2013/0236007 and 2021/0203499, which are each herein incorporated by reference in their entirety, both chief device 180 and first device 140 proceed to generate identical secret keys, namely first secret key 142, based upon the temporally changing gap between the chief device 180 and first device 140. After a period of time has elapsed, such as one second or up to several seconds (the length of the secret key being generated being somewhat dependent upon the duration of the signaling occurring in step 204), chief device 180 and first device 140 both terminate their emissions to one another through first device signal path 144. Chief device 180 and first device 140 continue to process the signals previously received from the opposing device through first signal path 144 and complete the secret key generation process in accordance, for example, with the methods taught in U.S. Pat. No. 8,320,562 and US Patent Application Publication Nos. 2013/0236007 and 2021/ 0203499, which are each herein incorporated by reference in their entirety. When the secret key generation process is complete at the chief device 180, the chief device 180 stores the secret key, namely first secret key 142, in its memory. Similarly, when the secret key generation process is complete at the first device 140, the first device 140 stores its corresponding secret key, which is identical to the secret key 142 generated and stored in memory at the chief device 180, in its memory as well. Note that at no time was key data sent between chief device 180 and first communication device 140 before, during, or after, the process of generating first secret key 142.

Next at step 206 chief device 180 moves or is moved proximal to a next device, such as second device 150, third device 160, or an Nth device 170. This next device will hereafter be referred to as the current device in process steps 208, 210, and 212. The distance between chief device 180 and the current device can, for example, be a meter or less if the chief device 180 is, for example, a handheld device, between one meter and 100 meters if the chief device 180 is, for example, a drone, or more than 100 meters if the chief device 180 is, for example, an aircraft or is in space.

Next in step 208 chief device 180 and current device emit and receive signals, such as intermittent sinusoidal signals, through the current signal path, which is second signal path 154 if the current device is the second device 150, or third signal path 164 if the current device is third device 160, or up to Nth signal path 174 if the current device is Nth device 170. Chief device 180 and current device synchronize their internal key generation processes with one another so that a secret key can be identically generated at the chief device 180 and current device, in which the secret key is the second secret key 152 if the current device is the second device 150, or in which the secret key is the third secret key 162 if the current device is the third device 160, or in which the secret key is the Nth secret key 172 if the current device is the Nth communication device 170.

After the chief device 180 and current device are synchronized, chief device 180 moves relative to current device (and/or current device moves relative to chief device 180 or both move with respect to each other), while both chief device 180 and current device emit and receive signals through the current signal path, and in accordance, for example, with the methods taught in U.S. Pat. No. 8,320,562 and US Patent Application Publication Nos. 2013/0236007 and 2021/0203499, which are each herein incorporated by reference in their entirety, both chief device 180 and current device proceed to begin to generate and manage identical secret keys, namely second secret key 152 if the current device is second device 150, third secret key 162 if the current device is third device 160, or Nth secret key 172 if the current device is the Nth device 170, based upon the temporally changing gap between the chief device 180 and current device.

After a period of time has elapsed, such as one second or up to several seconds (the length of the secret key being somewhat dependent upon the duration of the signaling of step 208), chief device 180 and current device both terminate their emissions to one another through next signal path. Chief device 180 and current device continue to process the signals already received from the opposing signaling device through the current signal path and complete the secret key generation process in accordance, for example, with the methods taught in U.S. Pat. No. 8,320,562 and US Patent Application Publication Nos. 2013/0236007 and 2021/ 0203499, which are each herein incorporated by reference in their entirety. When the secret key generation process is complete at the chief device 180, the chief device 180 stores the corresponding secret key, which is second key 152 if current device is second device 150, or the secret key is third secret key 162 if current device is third device 160, or the secret key is Nth secret key 172 if current is Nth communication device 170, into its memory for later use. Similarly, when the secret key generation process is complete at the current device, the current device stores its secret key, which is identical to the secret key generated and stored in memory at the chief device 180, in its memory as well. Note that at no time was key data sent between chief device 180 and the current device before, during, or after, the key generation process of step 208.

Next in step 210, at which point the processor within chief device 180 retrieves first secret key 142 from memory, as well as current secret key, and proceeds to encrypt the first secret key 142 with the current secret key to produce encrypted first key. Chief device 180 then proceeds to transmit encrypted first key to the current device through the current signal path. The data signal transmission by the chief device 180 through current signal path can be accomplished with the same hardware within chief device 180 as was used previously in step 208, or the transmission can be performed with a different set of hardware. Either way, in step 212 and after current device receives the encrypted first key from the chief device 180, the processor within current device retrieves its copy of current secret key from its memory and uses the retrieved secret key to decrypt encrypted first secret key thereby obtaining first secret key 142. The processor within the current device then stores first secret key 142 in its memory. Note that now at least three devices, first device 140, second device 150, and chief device 180, all now identically possess first secret key 142 which can be used to encrypt and decrypt data communicated amongst these devices.

Execution then proceeds to step 214. If the last device, such as the Nth communication device 170, in the system of devices which requested to participate in the secure communication now has possession of first secret key 142 then the Yes branch is taken out of step 214 into step 216 whereupon the process for generating an identical secret key at the more than two devices by way of chief device 180 is complete and the process terminates. However, if the last device, such as the Nth device 170, in the system of devices is not yet in possession of first secret key 142 then the No branch is taken back to step 206, where the steps 206 through 214 are repeated until all of the next devices which requested to participate in the secure communication are in possession of first secret key 142.

If after execution of step 216 the chief device 180 no longer needs any of the secret keys generated during the execution of the steps described in step 220 of FIG. 5 and still in its possession, then chief device 180 can discard any or all of its secret keys. Discarding, deleting, or otherwise purging any or all secret keys generated during the key generation process from memory can reduce the chances of theft of a secret key should chief device 180 be stolen, breached, hacked, or otherwise compromised by an adversary. However, as seen in the next example, described below, it may be beneficial for a chief device (e.g., 180 or 280) to retain possession of any or all of the secret keys generated in the manner described above.

Secure Communications Between a Chief Device and a Plurality of Devices Through the Internet The system and method disclosed in connection with FIG. 4 and FIG. 5 allow for a plurality of devices to communicate securely in a direct fashion as each device in the system identically possesses a first secret key 142, which is essentially a network key. This network key is common to each device in the network, such as first device 140, second device 150, chief device 180, etc., and is not specific to any one particular device. Since each device of a network typically has a unique address, such as an IP address if the network is an intranet or part of the internet, then the network key allows for the secure communications to and from each of these addresses, i.e., for each member of the network. The chief device 180 can store in memory the address of each of the plurality of devices, and further, can associate a particular device address with the network key or with a particular secret key unique to a particular device address.

A potential problem with a network key that is common across all devices comprising the network is that if the network key is compromised then every device within the intranet or system of devices can have their secure communications, which rely on the network key for security, compromised as well. To mitigate this risk it is a simple matter to dispense with the network key and instead rely upon the individual secret keys, such as first secret key 142 (associated with a first device having a first address), second secret key 152 (associated with a second device having a second address), third secret key 162 (associated with a third device having a third address), already stored in the memory of chief device 180 after the completion of the secret key generation process as illustrated and described above by way of example in connection with FIG. 4 and flowchart 220 in FIG. 5.

Figure 6:
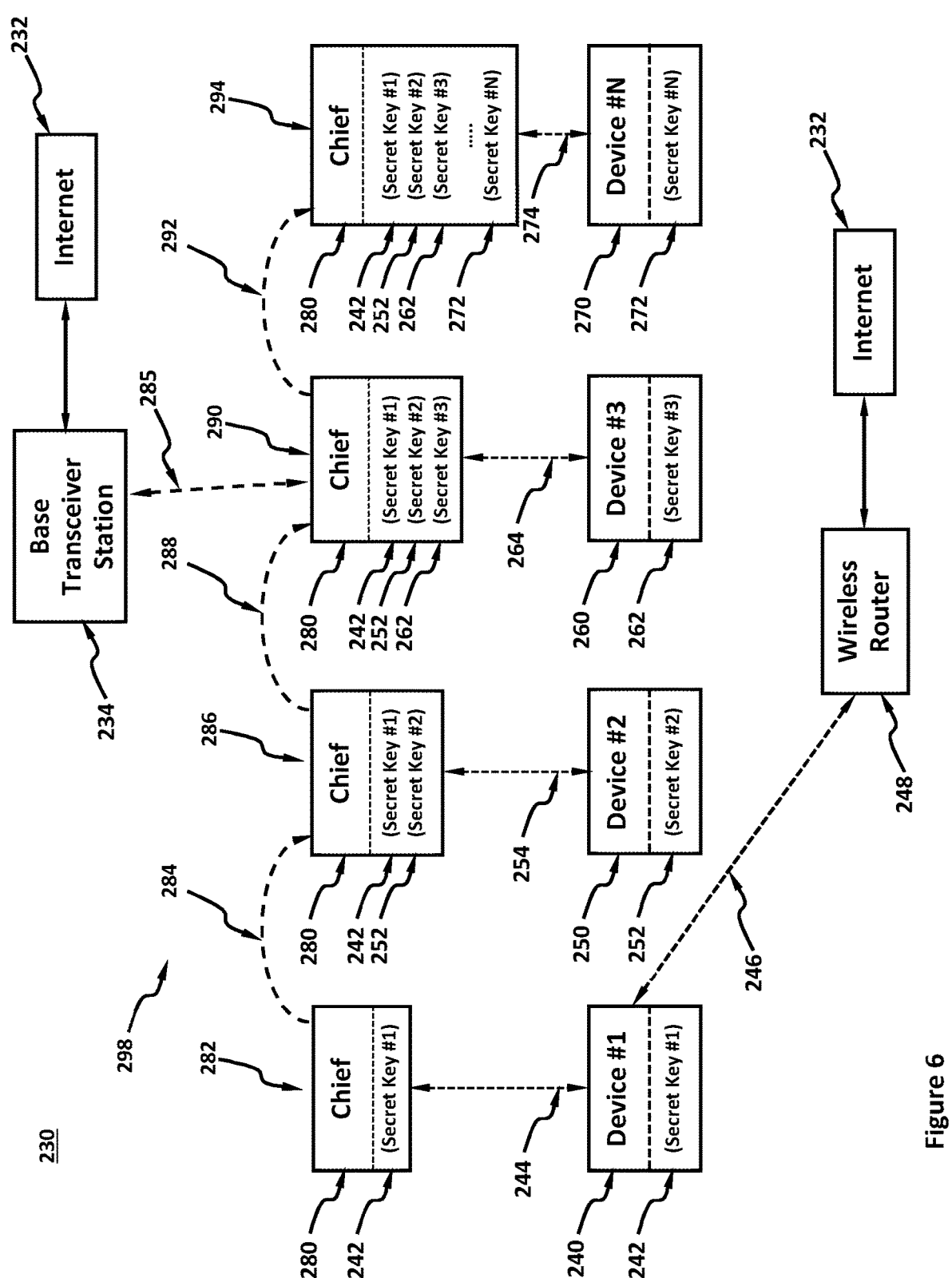
FIG. 6 is a partial block and partial functional diagram of another example of a system configured to generate and manage secret keys at three or more devices with the aid of a chief device in which the encrypted communications between the devices is through the internet.

FIG. 6 illustrates such a key generation system 230 in which, at the completion of the secret key generation process, the first secret key is not identically possessed by each device of the plurality of devices comprising key generation system 230 but instead each device retains its own unique device key and also the chief device 280 possesses each of the unique keys for each device as well as the associated unique address for each device. In exemplary key generation system 230 a first device 240, a second device 250, a third device 260, up to an Nth device 270 where N is an integer greater than two (if N=3 then third device 260 is also the Nth device 270), wish to communicate securely through an unsecure medium 298 not directly with each other but instead with chief device 280. First device 240 is the same as first device 140 and as first device 40, except as otherwise illustrated and described herein. In this example, first device 240 only possesses a first secret key 242 at the completion of the secret key generation process. Likewise, second device 250 is the same as second device 150 and as second device 50, except as otherwise illustrated and described herein. In this example, second device 250 only possesses a second secret key 252 at the completion of the secret key generation process. Likewise, third device 260 is the same as third device 160 and as third device 60, except as otherwise illustrated and described herein. In this example, third device 260 only possesses a third secret key 262 at the completion of the secret key generation process. Finally, Nth device 270 is the same as Nth device 170 and as Nth device 70, except as otherwise illustrated and described herein. In this example, Nth device 270 only possesses an Nth secret key 272 at the completion of the secret key generation process.

Chief device 280 is the same as chief device 60 and as chief device 180, except as otherwise illustrated and described herein. In this example, chief device 280 does not possess a secret network key, but instead possesses a first secret key 242 and associated address (not shown) of first device 240, a second secret key 252 and associated address (not shown) of second device 250, a third secret key 262 and associated address (not shown) of third device 260, up to an Nth secret key 272 and associated address of Nth device 270 at the completion of the secret key generation process. Chief device 180 can then communicate securely with each of the devices (although the non-chief devices cannot securely communicate with one another as they may have no device address information nor secret key information needed to secure the data communicated there-between). It is important to note that for illustration purposes N is shown to be greater than three in FIG. 6, in actuality N can be as small as one in which, for example, first device 240 and its address is the same device as Nth device 270.

Chief device 280 which can move along first path 284, second path 288, up to Nth-minus-one path 292 as chief device 280 moves within surrounding medium 298 as it moves from one device to another during the secret key generation process. A first device signal path 244 is available within surrounding medium 298 between the chief device 280 at location 282 and the first device 240; a second device signal path 254 is available within surrounding medium 298 between the chief 280 at location 286 and the second device 250; a third device signal path 264 is available within surrounding medium 298 between the chief device 280 at location 290 and the third device 260; up to an Nth device signal path 274 is available within surrounding medium 298 between the chief device 280 at location 294 and the Nth device 270. Note that surrounding medium 298 can itself be an unsecure medium and have hostile parties or signal taps that facilitate eavesdropping and interception of any signals emitted by the chief device 280 or any of the first device 240, second device 250, third device 260, and Nth device 270.

An example of a method for generating secret keys at one or more pairs of devices, in which one device is a chief device 280 such that a secure network is formed by the chief device 280 will now be described with reference to FIG. 6 and with reference to the flowchart 300 of FIG. 7. When an operator (not shown) but generally co-located with the chief device 280, wishes to form a secure communication network between a chief device 280 and two or more of first device 240, second device 250, third device 260, and so on to an Nth device 270, the process for generating a secret cryptographic key for each pair of devices, namely first secret key 242, second secret key 252, third secret key 262, up to an Nth secret key 272, and thereby forming a secure communication network with chief device 280, commences at step 302 and proceeds thereafter to step 304.

Next at step 304, chief device 280 moves or is moved proximal to first device 240 such as at location 282. By way of example, the distance between chief device 280 and first device 240 can be: a meter or less if the chief device 280 is, for example, a handheld device; between one meter; and 100 meters if the chief device 280 is, for example, a drone, or more than 100 meters if the chief device 280 is, for example, an aircraft or is in space.

Next in step 306, chief device 280 and first device 240 emit and receive signals, such as intermittent sinusoidal signals, through first signal path 244, and chief device 280 and first device 240 synchronize their internal key generation processes with one another so that first secret key 242 can be identically generated at the chief device 280 and first device 240.

After the chief device 280 and first device 240 are synchronized in step 306, chief device 280 moves or is caused to move relative to first device 240 (and/or first device 240 moves or is caused to move relative to chief device 280 or both are moved with respect to each other). While both chief device 280 and first device 240 emit and receive signals through first device signal path 244, and, for example, in accordance with the methods taught in U.S. Pat. No. 8,320,562 and US Patent Application Publication Nos. 2013/0236007 and 2021/0203499, which are each herein incorporated by reference in their entirety, both chief device 280 and first device 240 proceed to generate secret keys, namely first secret key 242, based upon the temporally changing gap between the chief device 280 and first device 240. After a period of time has elapsed, such as one second or up to several seconds (the length of the secret key being generated being somewhat dependent upon the duration of the signaling occurring in step 306), chief device 280 and first device 240 both terminate their emissions to one another through first device signal path 244. Chief device 280 and first device 240 continue to process the signals previously received from the opposing device through first signal path 244 and complete the secret key generation process in accordance with the methods taught, for example, in U.S. Pat. No. 8,320,562 and US Patent Application Publication Nos. 2013/0236007 and 2021/0203499, which are each herein incorporated by reference in their entirety. When the secret key generation process is complete at the chief device 280, the chief device 280 stores the secret key, namely first secret key 242, in its memory. Similarly, when the secret key generation process is complete at the first device 240, the first device 240 stores its corresponding secret key, which is identical to the secret key 242 generated and stored in memory at the chief device 280, in its memory as well. Note that at no time was key data sent between chief device 280 and first communication device 240 before, during, or after, the process of generating first secret key 242.

Next at step 308 chief device 180 prepares a message to be sent to first device 240 in which an address of first device 240 is requested. The request-for-address message is then encrypted with first secret key 242 by chief device 280, and then transmitted to first device 240 through first device signal path 244. Next, in step 310 first device 240 receives the encrypted message sent by chief device 280 through first device signal path 244 and decrypts the message with first secret key 242 and parses the decrypted received message and determines that chief device 280 is requesting the first device 240 to send its address, such as an IP address or other network address, to the chief device 280. First device 240 then prepares a message containing the address of first device 240, encrypts the message with first secret key 242, and transits the encrypted message to chief device 280 through first device signal path 244. Chief device 280 then receives the encrypted message from first device 240 through first device signal path 244, decrypts the message with first secret key 242 and obtains the address of first device 240, whereupon chief device 280 stores the address of first device in its memory.

One beneficial feature of step 310 is that it validates that a first secret key 242 was indeed generated and is identically possessed by both chief device 280 and first device 240. If step 310 fails for some reason, then processing can revert back to step 306 and re-attempt to generate and manage first secret key 242.

Next at step 312 chief device 180 moves or is moved proximal to a next device, such as second device 250, third device 260, or an Nth device 270, although in other examples the next device could be moved proximal the chief device 180 or both could be moved to be proximal to each other. This next device will hereafter be referred to as the current device in process steps 314, 316, 318, and 320. By way of example, the distance between chief device 280 and the current device can be: a meter or less if the chief device 280 is, for example, a handheld device; between one meter and 100 meters if the chief device 280 is, for example, a drone; or more than 100 meters if the chief device 280 is, for example, an aircraft or is in space.

Next in step 314 chief device 280 and current device emit and receive signals, such as intermittent sinusoidal signals, through the current signal path, which is second signal path 254 if the current device is the second device 250, or third signal path 264 if the current device is third device 260, or up to Nth signal path 274 if the current device is Nth device 270. Chief device 280 and current device synchronize their internal key generation processes with one another so that a secret key can be identically generated at the chief device 280 and current device, in which the secret key is the second secret key 252 if the current device is the second device 250, or in which the secret key is the third secret key 262 if the current device is the third device 260, or in which the secret key is the Nth secret key 272 if the current device is the Nth communication device 270.

After the chief device 280 and current device are synchronized, chief device 280 moves relative to current device (and/or current device moves relative to chief device 280 or both move with respect to each other), while both chief device 280 and current device emit and receive signals through the current signal path, and in accordance with the methods taught, for example, in U.S. Pat. No. 8,320,562 and US Patent Application Publication Nos. 2013/0236007 and 2021/0203499, which are each herein incorporated by reference in their entirety, both chief device 280 and current device proceed to begin to generate and manage identical secret keys, namely second secret key 252 if the current device is second device 250, third secret key 262 if the current device is third device 260, or Nth secret key 272 if the current device is the Nth device 270, based upon the temporally changing gap between the chief device 280 and the current device.

After a period of time has elapsed, such as one second or up to several seconds (the length of the secret key being somewhat dependent upon the duration of the signaling of step 314), chief device 280 and current device both terminate their emissions to one another through current signal path. Chief device 280 and current device continue to process the signals already received from the opposing device through current signal path and complete the secret key generation process in accordance with the methods taught, for example, in U.S. Pat. No. 8,320,562 and US Patent Application Publication Nos. 2013/0236007 and 2021/0203499, which are each herein incorporated by reference in their entirety. When the secret key generation process is complete at the chief device 280, the chief device 280 stores the secret key, which is second key 252 if current device is second device 250, or the secret key is third secret key 262 if current device is third device 260, or the secret key is Nth secret key 272 if current is Nth communication device 270, into its memory for later use. Similarly, when the secret key generation process is complete at the current device, the current device stores its corresponding secret key, which is identical to the secret key generated and stored in memory at the chief device 280, in its memory as well. Note that at no time was key data sent between chief device 280 and the current device before, during, or after, the key generation process of step 314.

Next at step 316 chief device 180 prepares a message to be sent to the current device in which the address of the current device is requested. The request-for-address message is then encrypted with the current secret key, which is second key 252 if current device is second device 250, or the secret key is third secret key 262 if current device is third device 260, or the secret key is Nth secret key 272 if current device is Nth communication device 270, by chief device 280, and then transmitted to current device through current device signal path.

Next, in step 318 current device receives the encrypted message sent by chief device 280 through current device signal path and decrypts the message with current secret key and parses the decrypted received message and determines that chief device 280 is requesting the current device to send its address, such as an IP address or other network address, to the chief device 280, wherein the address is the second device address if current device is second device 250, or the current device address is the third device address if current device is third device 260, or the current device address is the Nth device address if the device current is the Nth communication device 270.

Still within step 318, current device then prepares a message containing its address, encrypts the message with the current secret key in its possession, and transmits the encrypted message to chief device 280 through the current device signal path. Chief device 280 then receives the encrypted message from the current device through the current device signal path, decrypts the message with the current secret key in its possession and obtains the address of the current device, whereupon chief device 280 stores the address of current device in its memory in association with the generated secret key.

One beneficial feature of step 318 is that it validates that a secret key was indeed generated and is identically possessed by chief device 280 and the current device. If step 318 fails for some reason, then processing can revert back to step 314 and re-attempt to generate and manage a secret key with the current device.

Execution then proceeds to step 320. If the last device, such as the Nth communication device 270, in the system of devices now has possession of a secret key, such as Nth secret key 272 then the Yes branch is taken out of step 320 into step 322 whereupon the process for generating an identical secret key at one or more pairs of devices is complete and the process terminates. However, if the last device, such as the Nth device 270, in the system of devices is not yet in possession of a secret key, such as the Nth secret key 272, then the No branch is taken out of step 320 into step 312 whereupon the steps 312 through 320 are repeated until all of the devices are in possession of a secret key.

After the completion of the key generation process described by flowchart 300, chief device 280 possesses the address and secret key for each device. That is, chief device 280 possesses first secret key 242 and address associated with first device 240, second secret key 252 and address associated with second device 250, third secret key 262 and address associated with third device 260, up to and Nth secret key 272 and address associated with an Nth device 270, where N is an integer having a value of one or greater. Similarly, after the completion of the key generation process described by flowchart 300, first device 240 possesses a first secret key 242 that is nominally identical in value to the first secret key 242 possessed by chief device 280, second device 250 possesses a second secret key 252 that is nominally identical in value to the second secret key 252 possessed by chief device 280, third device 260 possesses a third secret key 262 that is nominally identical in value to the third secret key 262 possessed by chief device 280, and up to a Nth device 270 possesses an Nth secret key 272 that is nominally identical in value to the Nth secret key 272 possessed by chief device 280. Each of the devices, including chief device 280, can, for example, retain possession of the secret keys (and device addresses) in non-volatile memory, such as flash memory, so that the keys are available to encrypt data sent between the chief device 280 and any one of the devices first device 240, second device 250, third device 260, on up to an Nth device 270.

After the completion of the key generation process described by flowchart 300, chief device 280 is free to communicate securely with any of first device 240, second device 250, third device 260, on up to an Nth device 270 through an unsecure medium, such as unsecure medium 298, or an unsecure communication network such as the internet 232. As shown in FIG. 6, to facilitate theses communications, chief device 280 is in radio communications with a base transceiver station 234, which can be a two-way radio transceiver for mobile devices (such as a cell-tower station), wherein base transceiver station 234 is directly coupled to the internet 232. Also as shown in FIG. 6, to facilitate these communications, a wireless router 248, or a plurality of wireless routers, each of which can be a two-way radio transceiver that operates in accordance with Bluetooth or Wi-Fi radio standards, is provided within communication range to first device 240, second device 250, third device 260, on up to an Nth device 270, wherein wireless router 248 (or the plurality of wireless routers) is also coupled to the internet 232. In this way chief device 280 as well as first device 240, second device 250, third device, 260, up to an Nth device 270, can all communicate data into, through, and from the internet 230 and any devices coupled thereto.

Therefore, after the completion of the key generation process described by flowchart 300, provided chief device 280 is within radio range of any base transceiver station, such as base station 234, and even if the chief device 280 is several kilometers removed from first device 240, second device 250, third device 260, on up to Nth device 270, the chief device 280 can communicate securely, by way of secret keys first secret key 242, second secret key 252, third secret key 262, up to an Nth secret key 272, respectively, with these devices through the internet 232 provided the devices are in communication with wireless router 248 which is also coupled to the internet. Importantly, in this example the wireless routers, such as wireless router 248, described throughout this disclosure can in fact be wired routers and be coupled electronically (or photonically) to one or more communication devices.

The cryptographic example described above in connection with FIG. 6 and FIG. 7 is known as end-to-end encryption as the data is encrypted by the originator of the data and is not decrypted until the data has reached its final destination. That is, end-to-end encryption is a system of communication where only the communicating users can read the messages. It prevents potential eavesdroppers, including internet providers, telecom providers, router providers, device providers, and even the provider(s) of the communication service(s), from being able to access the cryptographic keys needed to decrypt the data. End-to-end encryption is a hugely beneficial feature of examples of this technology.

Figure 8:
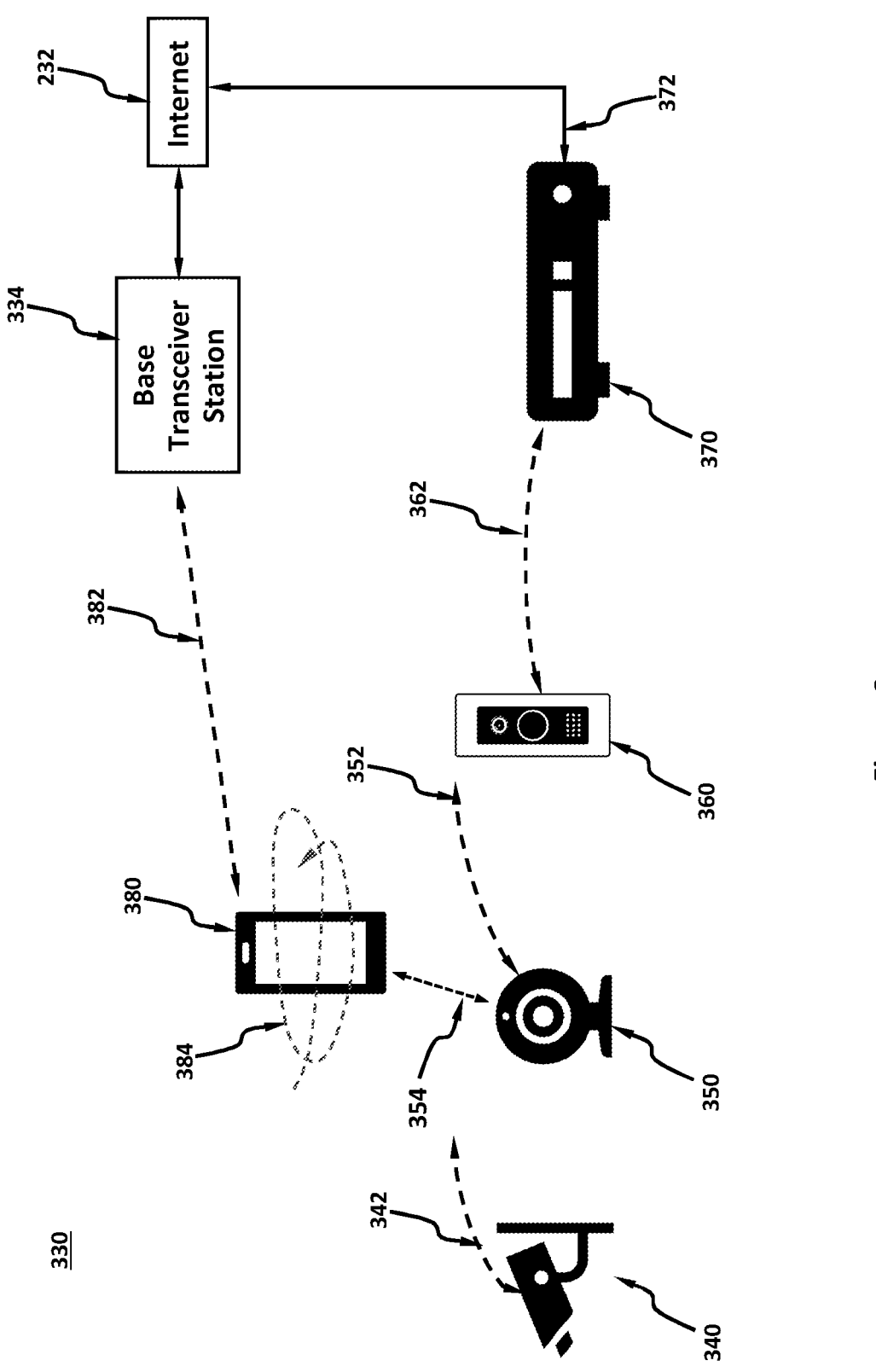
FIG. 8 is a partial block and partial functional diagram of an exemplary IoT system which provides secure communications for IoT devices through the internet with an exemplary chief device.

The IoT system 330 depicted in FIG. 8 is a non-abstract example of secure communications of IoT devices through the internet 232 with a chief device 380. In secure IoT network 330, the abstract devices described previously (such as first device 240, second device 250, etc.) are exemplarily shown as security camera 340, baby monitor 350, and smart door-bell 360. The IoT network 330 also includes a wireless router 370 that is connected to the internet 232 through router internet connection 372, although other examples and components comprising IoT network 330 are possible as well. Additionally, in IoT network 330 the chief device is a smart phone 380 which is caused to move from device to device by an operator, as well as being caused to move in a random-like swiping motion during the secret key generation process as described above. In FIG. 8 the chief device 380 (which is a smart phone in this example) is shown proximal to baby monitor 350, and moving in a swiping motion along swipe path 384 while signaling occurs along baby monitor signal path 354 as secret keys are identically created between smart phone 380 and baby monitor 350 as described above in connection with FIG. 6 and FIG. 7.

Note also in FIG. 8 that each of IoT devices security camera 340, baby monitor 350, and smart door-bell 360, are equipped with radio hardware, such as radio hardware in accordance with the Bluetooth and/or Wi-Fi communication standard, such that security camera 340, baby monitor 350, and smart door-bell 360 can communicate wirelessly with wireless router 370 and thereby communicate with other devices such as, for example, chief device 380 coupled to the internet 232. At the end of the secret key generation process (e.g., after the process described in flowchart 300 has completed), the chief device 380 (which is a smart phone in this example) will possess a secret key for security camera 340 along with the address of security camera 340, a secret key for baby monitor 350 along with the address of baby monitor 350, as well as a secret key for smart door-bell 360 along with the address of smart door-bell 360. Further, security camera 340 will possess the same secret key held in possession by chief device 380 (which is a smart phone in this example) for its address, baby monitor device 350 will possess the same secret key held in possession by chief device 380 (which is a smart phone in this example) for its address, and smart door-bell 360 will possess the same secret key held in possession by chief device 380 (which is a smart phone in this example) for its address. Note also that security camera 340 can communicate wirelessly with wireless router 370 (and hence with the internet 232) through signal path 342, baby monitor 350 can communicate wirelessly with wireless router 370 (and hence with the internet 232) through signal path 352, and smart door-bell 360 can communicate wirelessly with wireless router 370 (and hence with the internet 232) through signal path 362.

Also as illustrated in FIG. 8, chief device 380 (which is a smart phone in this example) is in radio communication with base transceiver station 334 via cell phone wireless path 382, and smart phone 380 therefore can communicate with any device, such as security camera 340, baby monitor 350, and smart door-bell 360, through internet 232. Importantly, in this example smart phone 380 can communicate securely with security camera 340, baby monitor 350, and smart door-bell 360 by encrypting data sent to these devices with the key associated with the respective device address, and decrypting data received from a device with the key associated with that device's address.

An application program executing on chief device 380 (which is a smart phone in this example), such as an app for notifying a user when smart door-bell 360 has been rung, which can also display associated video of the person ringing the smart door-bell 360, can encrypt and decrypt data communications with the smart door-bell 360 and wherein the smart door-bell 360 can decrypt and encrypt data communications with the chief device 380 (which is a smart phone in this example) using the identical secret key generated during execution of flowchart 300 and possessed by both the chief device 380 (which is a smart phone in this example) and the smart door-bell device 360.

There are other IoT settings in addition to the household setting described above and in connection to FIG. 8. For example, the setting can be a hospital setting in which case the IoT devices can be one or more infusion pumps, respirators, monitors, etc., and the chief device can be a smartphone, tablet, or similarly equipped mobile device. An alternate setting can be the human body in which the IoT devices can be one or more pacemakers, implanted blood analyzer, or oxygen sensor and the and the chief device can be a smart-phone, smart watch, or similarly equipped mobile device. Yet another setting can be a factory wherein the IoT devices may comprise one or more smoke alarms, motion detectors, access control systems, machines, security cameras, and the chief device can be a smart-phone. Yet another setting can be a battlefield wherein the communicating devices may, for example, be a tank, a soldiers, an artillery piece, or an autonomous supply vehicle, and the chief device can be a drone.

Another variation of examples of this technology concern wireless router 270 and wireless router 370. Instead of being wireless, wired routers can be utilized instead to couple the devices to the internet 232, in which case router signal path 246, security camera router signal path 342, baby monitor router signal path 352, and smart door-bell router signal path 362 are replaced with electrical conductors (e.g., wires) to convey signals and data between the devices and the internet 232.

Secure Network Topologies

The secure communication networks formed with the aid of a chief device as described above in connection with FIGS. 2 through 8 have been described in a generic sense without reference to a topology of the secure communication network. According to Wikipedia, a "Network topology is the arrangement of the elements (links, nodes, etc.) of a communication network. Network topology can be used to define or describe the arrangement of various types of telecommunication networks, including command and control radio networks, industrial field busses and computer networks. Network topology is the topological structure of a network and may be depicted physically or logically. It is an application of graph theory wherein communicating devices are modeled as nodes and the connections between the devices are modeled as links or lines between the nodes." Examples of network topologies, as described further, below, include meshes (fully and partially interconnected), star, tree, snowflake, ring, line, and bus, each of which can have the communications of their member devices secured with the use of a chief device as described previously.

As further described in Wikipedia, and applied to examples of this technology, is a further description of the various network topologies in which the networks are comprised of links and nodes. The nodes are the communication devices of examples of this technology secured with a first secret key and the chief device as described above, and further, per Wikipedia, "are the points of connection of the transmission medium to transmitters and receivers of the electrical, optical, or radio signals carried in the medium. Nodes may be associated with a computer, but certain types may have only a microcontroller at a node or possibly no programmable device at all. In the simplest of serial arrangements, one RS-232 transmitter can be connected by a pair of wires to one receiver, forming two nodes on one link, or a Point-to-Point topology. While the conventional system building blocks of a computer [and/or communication] network include network interface controllers (NICs), repeaters, hubs, bridges, switches, routers, modems, gateways, and firewalls, most address network concerns beyond the physical network topology and may be represented as single nodes on a particular physical network topology."

As further described in Wikipedia, and applied to examples of this technology, is the concept of a link which according to Wikipedia: "The transmission media (often referred to in the literature as the physical media) used to link devices to form a computer [and/or communication] network include electrical cables (Ethernet, HomePNA, power line communication, G.hn) optical fiber (fiber-optic communication), and radio waves (wireless networking). A widely adopted family of transmission media used in local area network (LAN) technology is collectively known as Ethernet."

Figure 9:
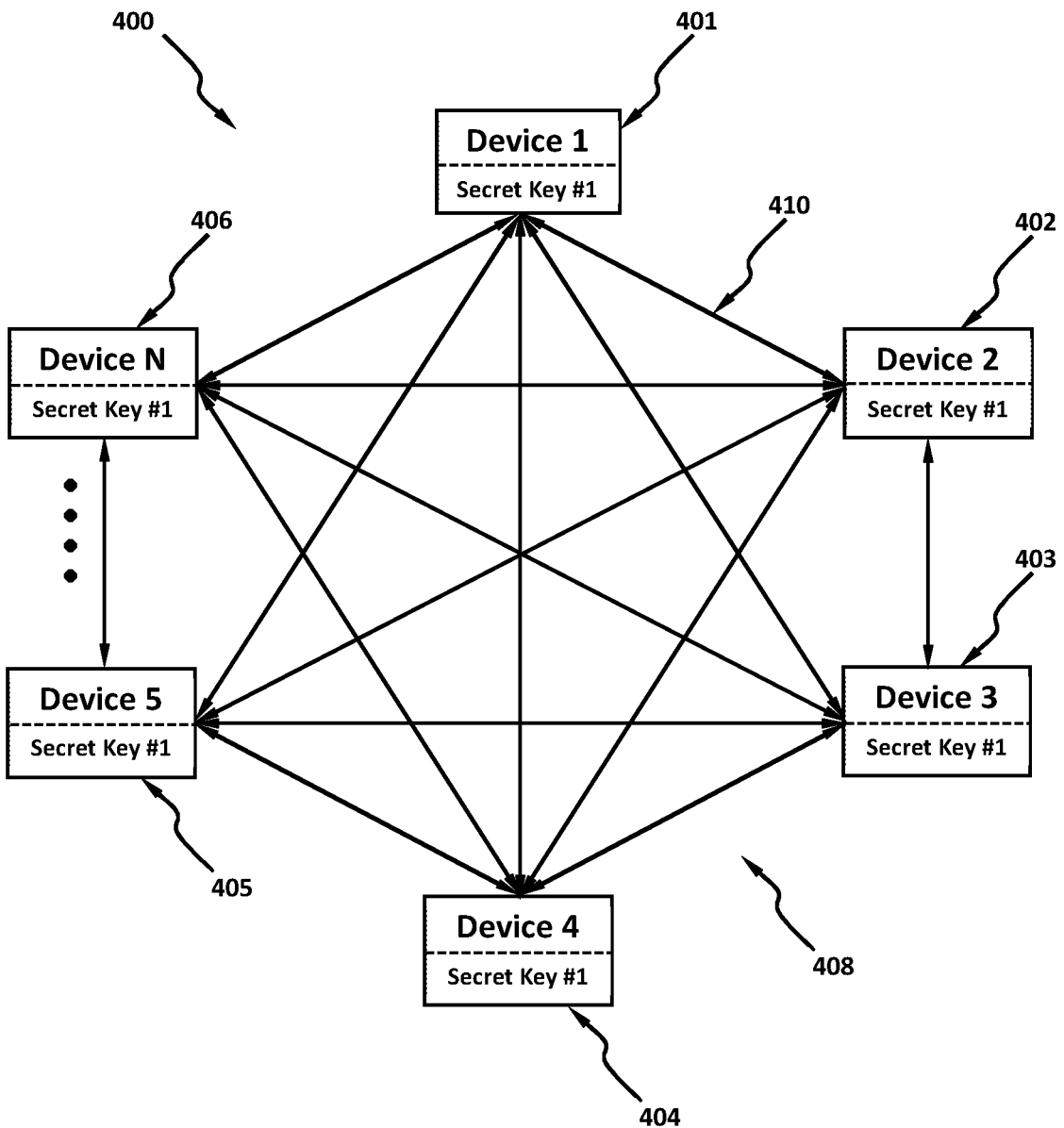
FIG. 9 is a diagram of an exemplary system in which the devices are coupled in a fully-connected mesh topology.

An example of a secure network—that can be secured with the key generation process described above—configured as a fully-connected mesh topology communication system is illustrated in FIG. 9. As seen in FIG. 9, secure fully connected mesh communication system 400 can comprise a first communication device 401, a second communication device 402, on up to an Nth communication device 406, each of which—after being secured with a chief device as illustrated and described previously in connection with the examples in FIGS. 2 through 8—has possession of a first secret key that is used to secure the communications between the devices. All or some of the devices, such as first communication device 401 and second communication device 402, comprising fully connected mesh communication system 400, can be an IOT device, a security camera, a baby monitor, a smart door bell, a smart phone, an internet router, a base station, a radio (including one or more of a radio receiver, transmitter, or transceiver), a car, an aircraft, a water vehicle, or even a spacecraft. The number of devices, N, comprising fully connected mesh communication system 400 must be at least two but can be up to 1000 devices, or even 1,000,000 devices or more. The communication devices can be stationary or mobile, and it is possible that one of the devices can also be a chief device. In the fully-connected mesh topological network 400, each device comprising the network can communicate directly with any other device in the network, through a communication link, such as communication link 410 that links first communication device 401 and second communication device 402. Note that in the fully connected mesh communication system 400 example illustrated in FIG. 9 there is a communication link line drawn between each and every pair of devices to indicate that each and every device can communicate directly with each and every other device through communication medium 408. Since the communication links, such as communication link 410, are in a non-secured communication medium 408, the data sent through communication link 410 is generally encrypted with first secret key, which is identically possessed by each of the N communicating devices such as first communication device 401 and second communication device 402. Note that the communication links, such as communication link 410 can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 408 associated with the communicating devices comprising the fully connected mesh communication system 400.

Figure 10:
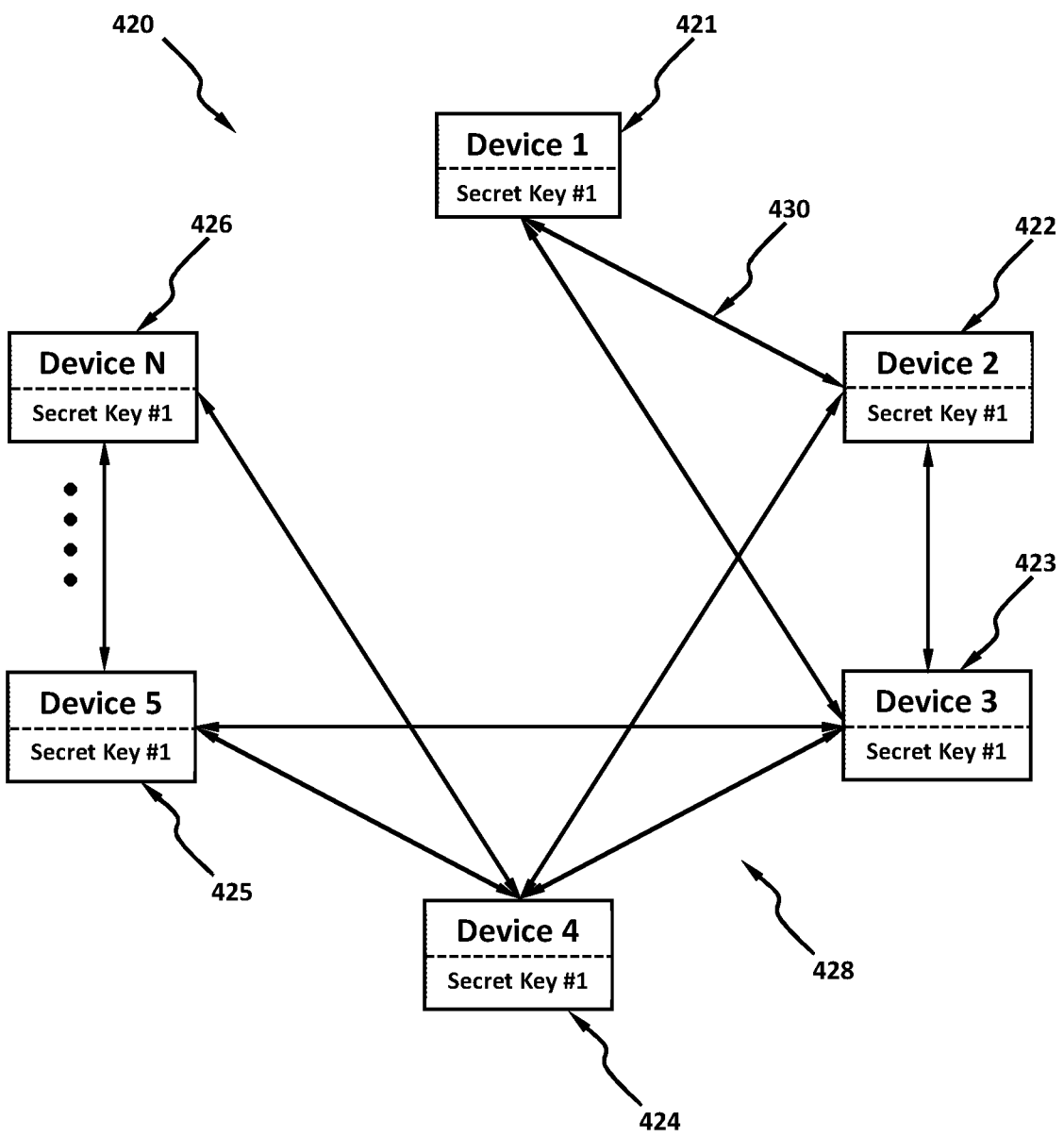
FIG. 10 is a diagram of an exemplary system in which the devices are coupled in a partially-connected mesh topology.

An alternate example of a secure network—that can be secured with the key generation process described above—is shown as a partially-connected mesh topology communication system in FIG. 10. As seen in FIG. 10, secure partially connected mesh communication system 420 can comprise a first communication device 421, a second communication device 422, on up to an Nth communication device 426, each of which—after being secured with a chief device as illustrated and described previously in connection with the examples in FIGS. 2 through 8—has possession of a first secret key that is used to secure the communications between the devices. All or some of the devices, such as first communication device 421 and second communication device 422, comprising partially-connected mesh communication system 420, can be an IOT device, a security camera, a baby monitor, a smart door bell, a smart phone, an internet router, a base station, a radio (including one or more of a radio receiver, transmitter, or transceiver), a car, an aircraft, a water vehicle, or even a spacecraft. The number of devices, N, comprising partially connected mesh communication system 420 must be at least two but can be up to 1000 devices, or even 1,000,000 devices or more. The communication devices can be stationary or mobile, and it is possible that one of the devices can also be a chief device. Note that in the partially-connected mesh communication system 420 example illustrated in FIG. 10 there is not a communication link line drawn between each and every pair of devices which means that each and every device cannot communicate directly with each and every other device through communication medium 428. Note, for example in the partially connected mesh communication system 420 illustrated in FIG. 10 there is not a communication link between first device 421 and fourth communication device 424. Since the communication links, such as communication link 430, can be in a non-secured communication medium 428, the data sent through a communication link 430 is generally encrypted with first secret key, which is identically possessed by each of the N communicating devices such as, for example, first communication device 421 and second communication device 422. Note that the communication links, such as communication link 430 can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 428 associated with the communicating devices comprising the partially-connected mesh communication system 420.

Figure 11:
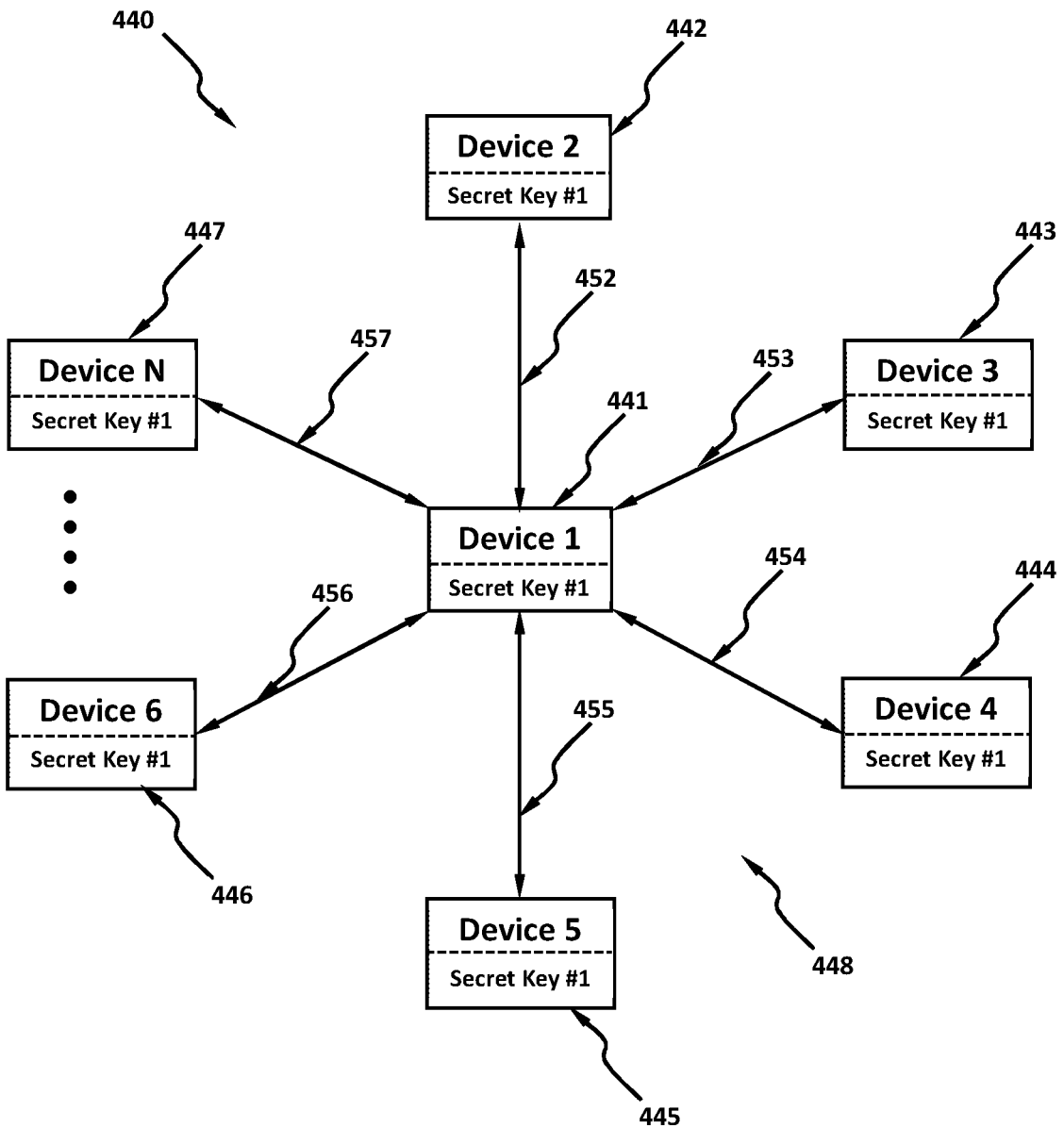
FIG. 11 is a diagram of an exemplary system in which the devices are coupled in a star topology.

Yet another alternate example of a secure network—that can be secured with the key generation process described above—is shown as star topology communication system in FIG. 11. As seen in FIG. 11, star communication system 440 can comprise a central communication device 441, and a plurality of peripheral communication devices such as second communication device 442, on up to an Nth communication device 447, each of which—after being secured with a chief device as illustrated and described previously in connection with the examples in FIGS. 2 through 8—has possession of a first secret key that is used to secure the communications between the peripheral devices and the central communication device 441. The peripheral devices, such as, for example, second communication device 442 and third communication device 443, comprising star communication system 440, can be an IOT device, a security camera, a baby monitor, a smart door bell, a smart phone, an internet router, a base station, a radio (including one or more of a radio receiver, transmitter, or transceiver), a car, an aircraft, a water vehicle, or even a spacecraft. The number of devices, N, comprising star communication system 440 must be at least two but can be up to 1000 devices, or even 1,000,000 devices or more. The communication devices can be stationary or mobile, and it is possible that one of the devices can also be the chief device. In star topological network 440, each peripheral device cannot communicate directly with any other peripheral device in the network, but can instead only communicate with central communication device 441. The communication between a peripheral device, such as, for example, second communication device 442, and the central communication device 441 takes place through a communication link, such as communication link 452 that links central communication device 441 and second communication device 442. Since the communication links, such as communication link 452, are in a non-secured communication medium 448, the data sent through a communication link 452 is generally encrypted with first secret key, which is identically possessed by each of the N communicating devices of the star network such as central communication device 441 and second communication device 442. Note that the communication links, such as communication links 452 through 457 can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in (although the device can be moved or both can be moved), through, above, below, or about the communication medium 448 associated with the communicating devices comprising the star communication system 440. Note further that the secure network described in connection with FIG. 6 is essentially configured as a star topology in which, for example, central communication device 441 can be chief device 280, second communication device 442 can be first device 240, third communication device 443 can be second device 250, and so on.

Figure 12:
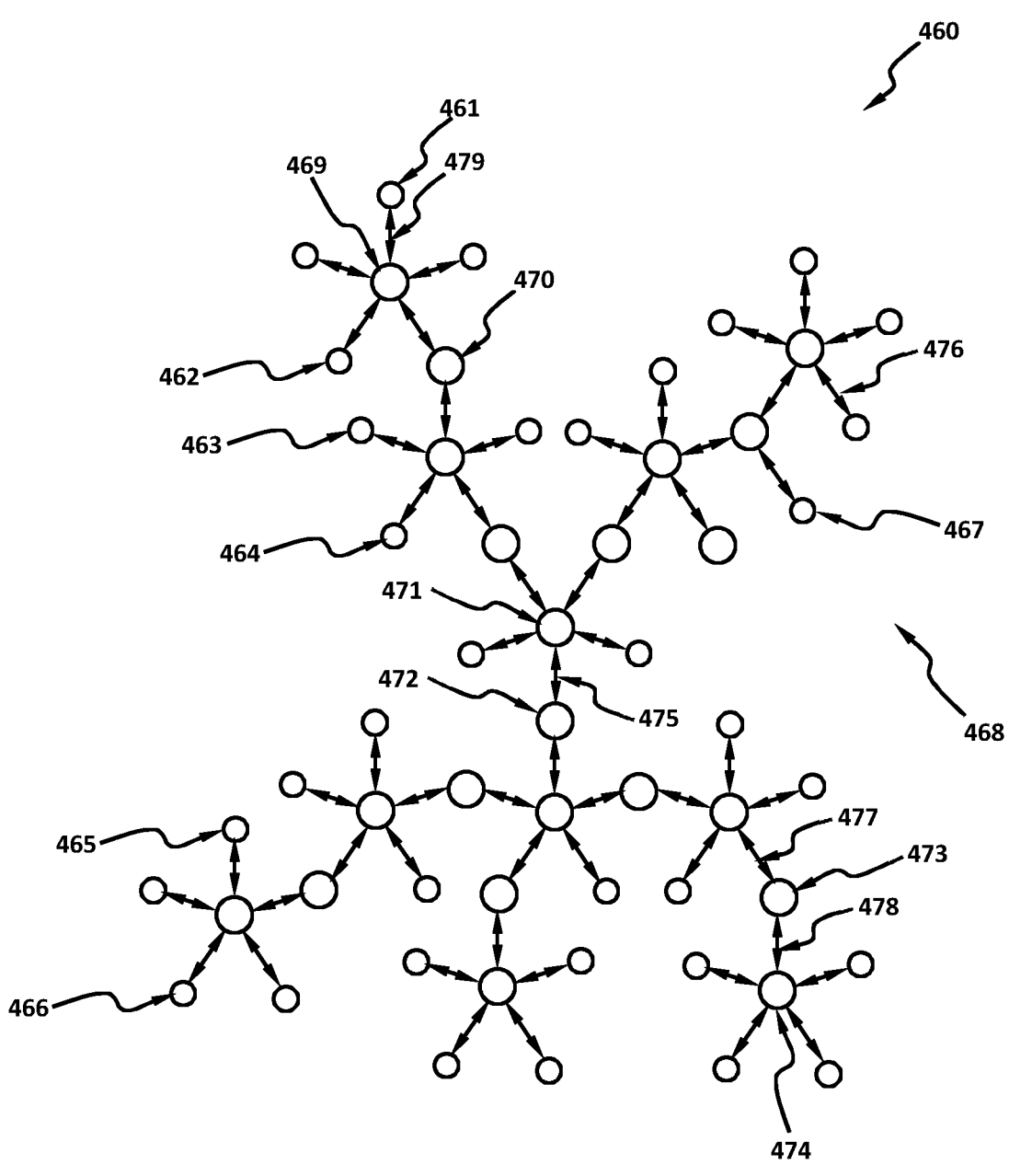
FIG. 12 is a diagram of an exemplary system in which the devices are coupled in a tree topology.

Yet another alternate example of a secure network—that can be secured with the key generation process described above—is shown as tree topology communication system 460 in FIG. 12. As seen in FIG. 12, tree communication system 460 can comprise a collection of star networks arranged in a hierarchy. Central communication devices, such as central communication device 469 and central communication device 470 can be in secure communication with one another as well as with their peripheral communication devices (if any) such as peripheral communication device 461. In each star sub-network there can be between zero and 10,000 peripheral communication devices; the number of central communication devices in the entire network can be between two and 10,000. Also, each central communication device of a star network is securely linked with at least one other central communication device of a star network such as, for example, central communication device 471 is linked to central communication device 472 through communication link 475. Note that each central communication device and each peripheral communication device—after being secured with a chief device as illustrated and described previously in connection with the examples in FIGS. 2 through 8—has possession of a first secret key that are used to secure the communications through their respectively available communication links. The peripheral devices, such as peripheral communication device 461 and peripheral communication device 462, as well as the central communication devices comprising tree communication system 460, can be an IOT device, a security camera, a baby monitor, a smart door bell, a smart phone, an internet router, a base station, a radio (including one or more of a radio receiver, transmitter, or transceiver), a car, an aircraft, a water vehicle, or even a spacecraft. The number of devices, N, comprising tree communication system 460 must be at least two but can be up to 1000 devices, or even 1,000,000 communication devices or more. The communication devices can be stationary or mobile, and it is possible that one of the devices can also be a chief device. In tree topological network 460, each peripheral device cannot communicate directly with any other peripheral device in the network, but can instead only communicate with a central communication device. The communication between a peripheral device, such as peripheral communication device 461, and central communication device 469 takes place through a communication link, such as, for example, communication link 479 that links central communication device 469 and peripheral communication device 461. Since the communication links, such as communication link 479, are in a non-secured communication medium 468, the data sent through a communication link 479 is generally encrypted with first secret key, which is identically possessed by each of the N communicating devices of the tree network. Note that the communication links, such as communication links 475 through 479 can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 468 associated with the communicating devices comprising the tree communication system 460.

Figure 13:
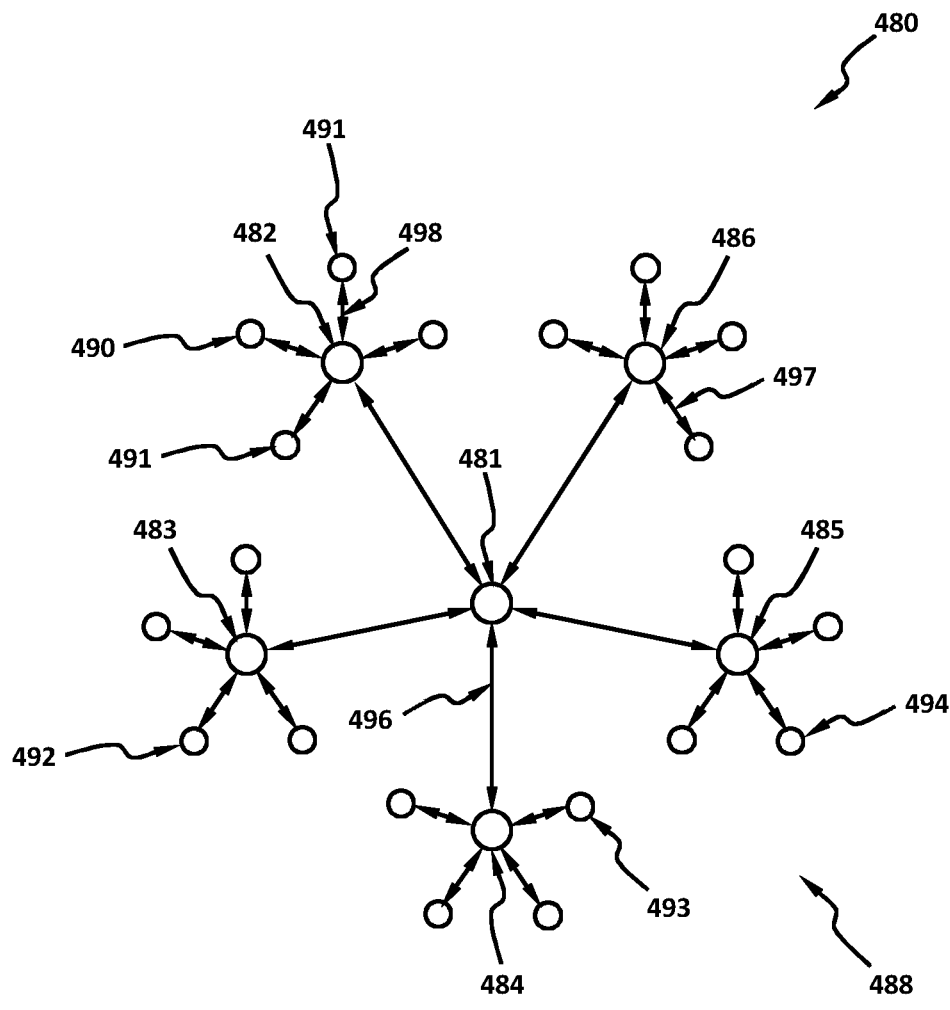
FIG. 13 is a diagram of an exemplary system in which the devices are coupled in a snowflake topology.

Yet another alternate example of a secure network—that can be secured with the key generation process described above—is shown as snowflake topology communication system 480 in FIG. 13. As seen in FIG. 13, snowflake communication system 480 can comprise a collection of star networks arranged in a non-hierarchical manner. A central communication device 481 is linked with surrounding central nodal points, such as central nodal points 482 through 486, each of which in turn are linked with their respective peripheral communication devices such as, for example, peripheral communication devices 490 and 491 which are both linked to central nodal communication device 482. In the snowflake topology communication system 480 none of the peripheral communication devices are in communication with one another, and none of the central nodal communication devices are in communication with one another. In each star sub-network there can be between zero and 10,000 peripheral communication devices; there can be up to 10,000 central nodes in the entire network. Also each central nodal communication device of a star network is securely linked with the central communication device of the snowflake network such as, for example, central communication device 481 is linked to central nodal communication device 484 through communication link 496. Note that each central communication device, each central nodal communication device, and each peripheral communication device—after being secured with a chief device as illustrated and described previously in connection with the examples in FIGS. 2 through 8—has possession of a first secret key that is used to secure the communications through their respectively available communication links. The peripheral devices, such as peripheral communication device 486 and peripheral communication device 485, as well as the central nodal communication devices and the central communication device 481 comprising snowflake communication system 480, can be an IOT device, a security camera, a baby monitor, a smart door bell, a smart phone, an internet router, a base station, a radio (including one or more of a radio receiver, transmitter, or transceiver), a car, an aircraft, a water vehicle, or even a spacecraft. The number of devices, N, comprising snowflake communication system 480 must be at least two but can be up to 1000 devices, or even 1,000,000 communication devices or more. The communication devices can be stationary or mobile, and it is possible that one of the devices can also be the chief device—in particular central communication device 481 can be a chief device. In snowflake topological network 480, each peripheral device cannot communicate directly with any other peripheral device in the network, but can instead only communicate with a central nodal communication device. Communication between devices, such as between peripheral communication device 491, and central nodal communication device 482 takes place through a communication link. Since the communication links, such as communication link 498, are in a non-secured communication medium 488, the data sent through a communication link is generally encrypted with first secret key, which is identically possessed by each of the N communicating devices of the snowflake network. Note that the communication links, such as communication link 498 can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 488 associated with the communicating devices comprising the snowflake communication system 480.

Figure 14:
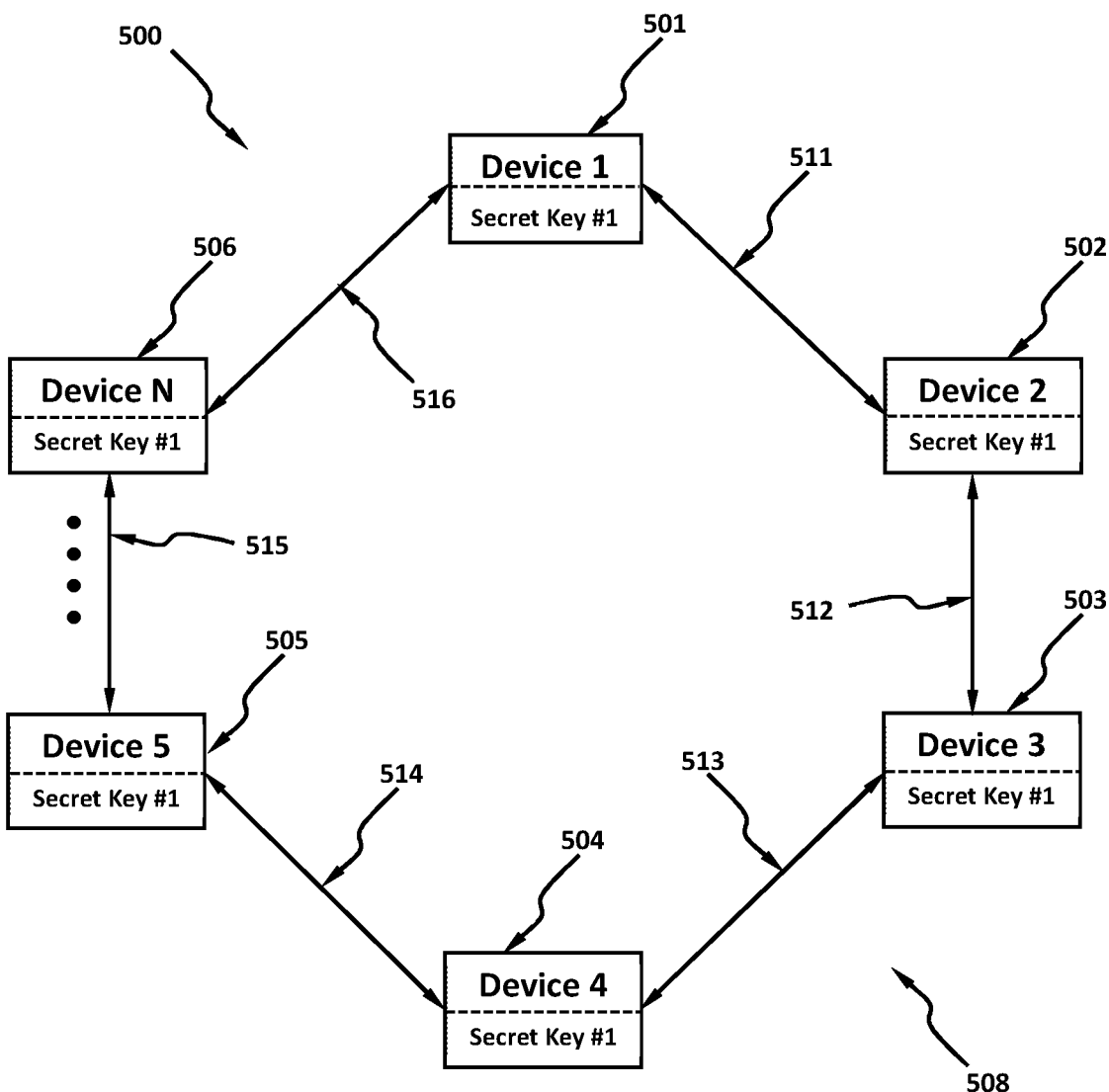
FIG. 14 is a diagram of an exemplary system in which the devices are coupled in a ring topology.

Yet another alternate example of a secure network—that can be secured with the key generation process described above—is shown as ring topology communication system 500 in FIG. 14. As seen in FIG. 14, ring communication system 500 can comprise a collection of communication devices arranged in a sequential manner in which each communication device is linked with two adjacent communication devices, such as, for example, second communication device 502 is in secure communication with first communication device 501 through communication link 511 as well as in secure communication with third communication device 503 through communication link 512. Note that each and every communication device—after being secured with a chief device as illustrated and described previously in connection with the examples in FIGS. 2 through 8—has possession of a first secret key that is used to secure the communications through their respectively available communication links. The communication devices comprising ring communication system 14, can be an IOT device, a security camera, a baby monitor, a smart door bell, a smart phone, an internet router, a base station, a radio (including one or more of a radio receiver, transmitter, or transceiver), a ground vehicle such as a car, an aircraft, a water vehicle, or even a spacecraft. The number of devices, N, comprising ring communication system 500 must be at least three, but can be greater, such as up to 1000 devices, or even 1,000,000 communication devices or more. The communication devices can be stationary or mobile, and it is possible that one of the communication devices can also be the chief device. Communication between devices, such as between third communication device 503, and fourth communication device 504 takes place through a communication link such as communication link 513. Since the communication links, such as communication link 513, are in a non-secured communication medium 508, the data sent through a communication link is generally encrypted with first secret key, which is identically possessed by each of the N communicating devices of the ring network. Note that the communication links, such as communication link 514, can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 508 associated with the communicating devices comprising the ring communication system 500.

Figure 15:
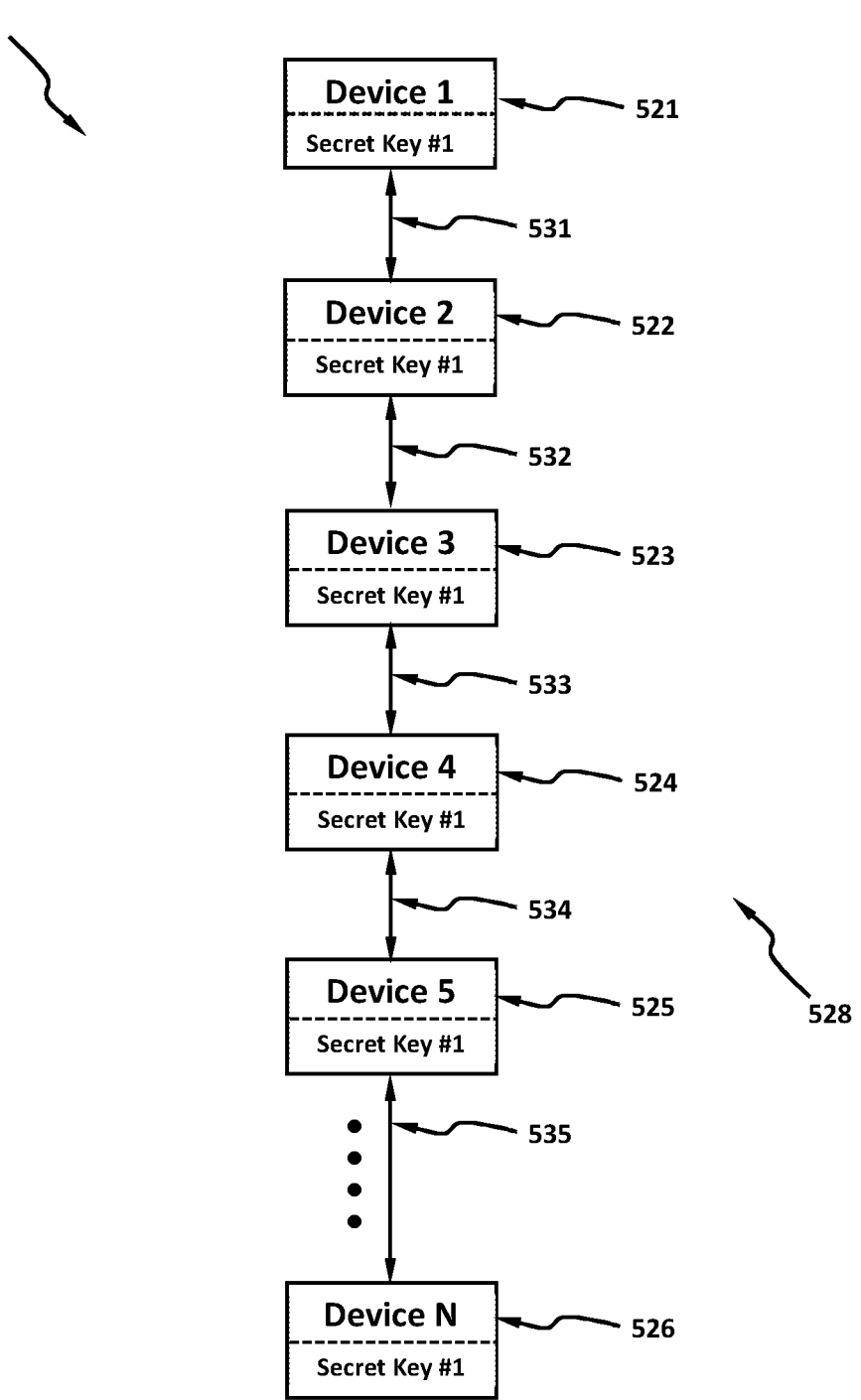
FIG. 15 is a diagram of an exemplary system in which the devices are coupled in a line topology.

Yet another alternate example of a secure network—that can be secured with the key generation process described above—is shown as line topology communication system 520 in FIG. 15. As seen in FIG. 15, line communication system 520 can comprise a collection of communication devices arranged in a sequential manner in which all but two communication devices are linked with two adjacent communication devices, such as, for example, second communication device 522 is in secure communication with first communication device 521 through communication link 531 as well as in secure communication with third communication device 523 through communication link 532. In the example line communication system 520 first communication device 521 and Nth communication device 526 are each linked with only one other communication device. (If first communication device 521 and Nth communication device 526 were also linked with each other than the result would be a ring communication network as described in connection with FIG. 14.) Note that each and every communication device—after being secured with a chief device as illustrated and described previously in connection with the examples in FIGS. 2 through 8—has possession of a first secret key that is used to secure the communications through their respectively available communication links. The communication devices comprising line communication system 520, can be an IOT device, a security camera, a baby monitor, a smart door bell, a smart phone, an internet router, a base station, a radio (including one or more of a radio receiver, transmitter, or transceiver), a ground vehicle such as a car, an aircraft, a water vehicle, or even a spacecraft. The number of devices, N, comprising line communication system 520 must be at least two but can be up to 1000 devices, or even 1,000,000 communication devices or more. The communication devices can be stationary or mobile, and it is possible that one of the communication devices can also be the chief device. Communication between devices, such as, for example, between third communication device 523, and fourth communication device 524 takes place through a communication link such as communication link 533. Since the communication links, such as communication link 533, are in a non-secured communication medium 528, the data sent through a communication link is generally encrypted with first secret key, which is identically possessed by each of the N communicating devices of the line network 520. Note that the communication links, such as communication link 534, can be a radio link, an optical link, an acoustic link, or even a wired link in which the data is sent through an electrically conductive wire or optically transmissive fiber. Note that in the key generation process, the chief device, which facilitates the process as described above, is generally moved with respect to each device in, through, above, below, or about the communication medium 528 associated with the communicating devices comprising the line communication system 520.

Figure 16:
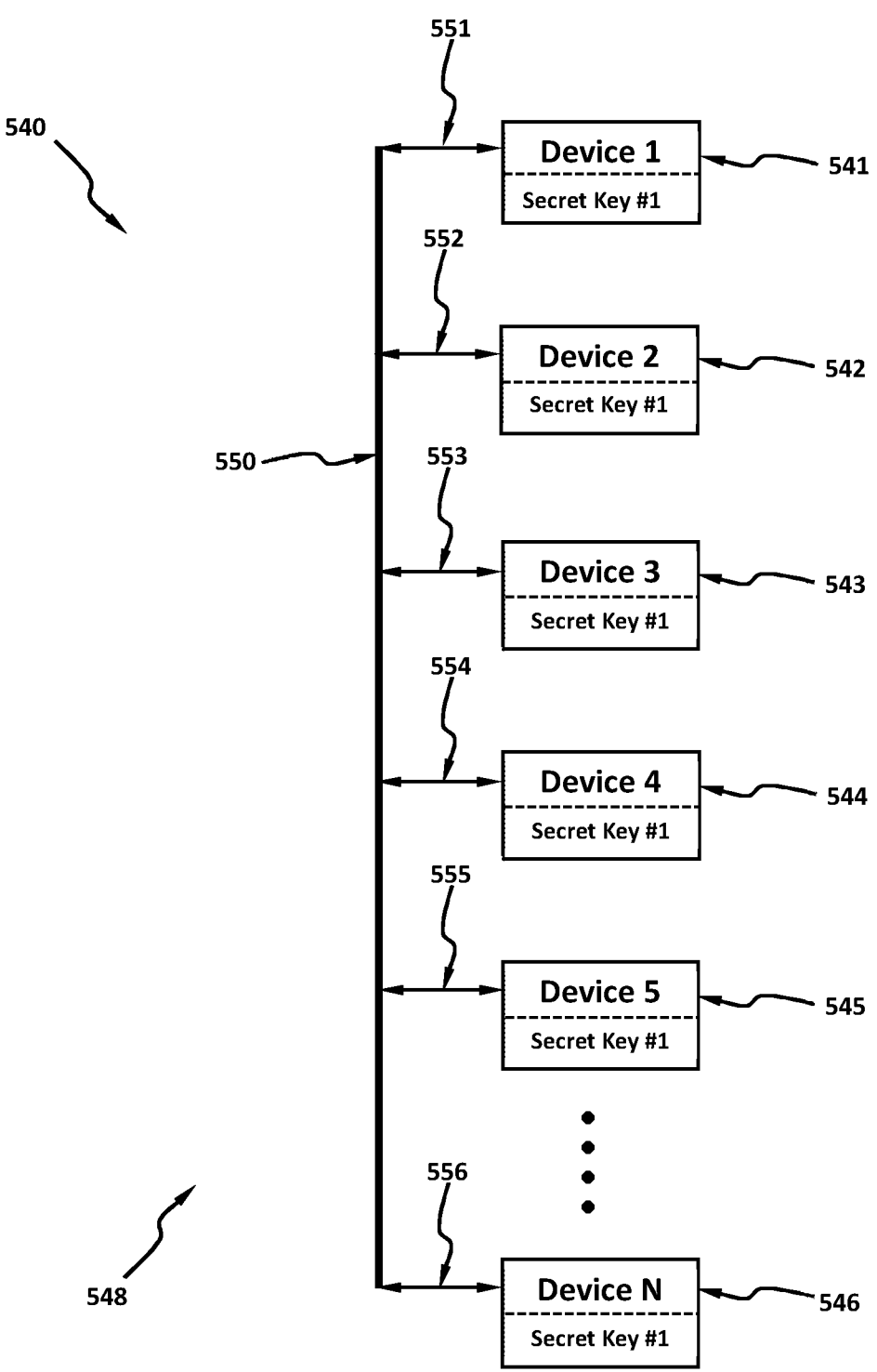
FIG. 16 is a diagram of an exemplary system in which the devices are coupled in a bus topology.

Yet another alternate example of a secure network—that can be secured with the key generation process described above—is shown as bus topology communication system 540 in FIG. 16. As seen in FIG. 16, bus communication system 540 can comprise a collection of communication devices arranged so they are each coupled to a communication bus 550 through their respective communication links. For example, as shown in FIG. 16, a first communication device 541 is coupled to communication bus 550 through first communication link 551, a second communication device 542 is coupled to communication bus 550 through second communication link 552, and so on. In such a bus communication system 540 each and every one of the communication devices can generally communicate with each every other one of the devices comprising the bus communication system through communication busses, although in some such bus communication systems one of the communication devices may be designated as the Master Device and the remaining devices are designated as Slave Devices in which cases the Slave Devices generally do not communicate directly with one another. In this latter case the Master Device can also be the chief device used to generate and manage and distribute the first secret key to the communication devices comprising bus communication network 540. Note that each and every communication device—after being secured with a chief device as illustrated and described previously in connection with the examples in FIGS. 2 through 8—has possession of a first secret key that is used to secure the communications to other devices coupled to bus 550. The communication devices comprising bus communication system 540, can be an IOT device, a security camera, a baby monitor, a smart door bell, a smart phone, an internet router, a base station, a radio (including one or more of a radio receiver, transmitter, or transceiver), a ground vehicle such as a car, an aircraft, a water vehicle, or even a spacecraft. The number of devices, N, comprising bus communication system 540 must be at least two but can be up to 1000 devices, or even 1,000,000 communication devices or more. The communication devices can be stationary or mobile, and it is possible that one of the communication devices can also be the chief device. Communication between devices, such as between third communication device 543, and fourth communication device 544 takes place through the bus 550 and communication links such as third communication link 553 and fourth communication link 554 respectively. Since the communication links and the bus 550 are in a non-secured communication medium 548, the data sent through the bus 550 and a communication link is generally encrypted with first secret key, which is identically possessed by each of the N communicating devices of the bus network. Note that the communication links, such as first communication link 551, can be a radio link, an optical link, an acoustic link, or even a wired link in which the data is sent through an electrically conductive wire or optically transmissive fiber. The bus 550 is generally a hardware link in which the secure data is sent through an electrically conductive wire or optically transmissive fiber, although the internet can also function as a bus as well. Note that in the key generation process, the chief device, which facilitates the process as described above, is generally moved with respect to each device in, through, above, below, or about the medium 548 associated with the communicating devices comprising the bus communication system 540.

It is important to note that the network topologies described above are not necessarily all inclusive as additional topologies can be secured with the methods described in examples of this technology. Further, network topologies are also possible that are a mixture of two or more of the topologies described above, such as for example, a network topology consisting of a ring topology in which one of the nodes of the ring may serve as the central communicating device of a star sub-network. In these cases each of the nodes of such a mixed-topology network can also be secured by the use of a chief device as described above in connection with FIGS. 2 through 8. Further, in some instances it may be beneficial to employ more than one chief device, each of which can facilitate the generation and distribution of a secret key as described above in connection with FIGS. 2 through 8, to sub-networks in which case facilities would be need to be provided to either share the disparate secret keys across the sub-networks or facilities would be need to be provided to decrypt and re-encrypt the messages with the different unique sub-network keys as the encrypted message pass from one sub-network to another.

Lastly, it may be beneficial in some cases or topologies where the network is secured with two or more secret keys. As an example, the lower half of tree network 460 (e.g., below communication device 472) may be secured with a first secret while the rest of the devices of the tree (e.g., those devices above communication device 472) may be secured with a second secret key. In this case a chief device would first have to generate and manage and distribute the first secret key to the lower devices, and then a chief device would have to generate and manage and distribute a second secret key to the upper devices (note that central communication device 472 would need to possess both secret keys). The number of secret keys generated and distributed with the use of a chief device in accordance with examples of this technology to secure a communication network can range from 1 up to 1000.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A secure communication system comprising:
a chief device comprising a motion detection system coupled to a memory comprising programmed instructions stored thereon and one or more processors which are configured to be capable of executing the stored programmed instructions to:
generate a secret key based upon relative motion detected by the motion detection system between the chief device and each of a corresponding one of a plurality of communication devices initiating a secure communication, wherein the generated secret key between each pair of the chief device and each of the corresponding one of the communication devices initiating the secure communication is different and matches a corresponding secret key generated at the corresponding one of the communication devices generated based on the relative motion between the chief device and the corresponding one of the plurality of communication devices; and
transmit one of the generated secret keys for one of the communication devices initiating the secure communication between the chief device and another one of the communication devices at least partially encrypted with the generated secret key for the another one of the communication devices to enable the secure communication with the one of the generated secret keys between the one of the communication devices and the another one of the communication devices.

2. The system of claim 1, wherein the one or more processors are configured to be capable of executing the stored programmed instructions further comprising instructions to:
synchronize signaling between the chief device and each of the corresponding one of the communication devices initiating a secure communication before the generate the secret key between the chief device and each of the corresponding one of the communication devices.

3. The system as set forth in claim 1, wherein the relative motion comprises the relative motion of the chief device with respect to each of the corresponding one of the communication devices.

4. The system as set forth in claim 1, wherein the relative motion comprises the relative motion of each of the corresponding one of the communication devices with respect to the chief device.

5. The system as set forth in claim 1, wherein the relative motion comprises the relative motion of each of the corresponding one of the communication devices and of the chief device with respect to each other.

6. The system as set forth in claim 1, wherein the communication devices comprise three or more of the communication devices and wherein the transmit the one of the generated secret keys securely provides the one of the generated secret keys to each of the three or more communication devices.

7. The system as set forth in claim 1, wherein the one or more processors are configured to be capable of executing the stored programmed instructions further comprising instructions to:
receive a request to initiate the secure communication between two or more of the communication devices, wherein the generate the secret key is initiated in response to the received request.

8. The system as set forth in claim 1, wherein the one or more processors are configured to be capable of executing the stored programmed instructions further comprising instructions to:
delete the generated secret keys for the communication devices initiating the secure communication once a common one of the generated secret keys is shared between the communication devices.

9. The system as set forth in claim 1, wherein the communication devices comprise three or more of the communication devices and wherein the one or more processors are configured to be capable of executing the stored programmed instructions further comprising instructions to:
store the generated secret key for each of the three or more communication devices; and
utilize the stored generated secret key for each of two or more of the three or more communication devices which have requested initiation of the secure communication to enable the secure communication.

10. The system as set forth in claim 1, wherein the one or more processors are configured to be capable of executing the stored programmed instructions further comprising instructions to:

send a message encrypted with the generated secret key based upon relative motion detected by the motion detection system between the chief device and one of the communication devices to the one of the communication devices requesting a network address;

receive the network address encrypted with the generated secret key with the generated secret key based upon relative motion detected by the motion detection system between the chief device and one of the communication devices; and store the received network address with the generated secret key based upon relative motion detected by the motion detection system between the chief device and one of the communication devices.

11. A method for making a secure communication system, the method comprising:

providing a chief device comprising a motion detection system coupled to a memory and one or more processors; and programming instructions in the memory, wherein the one or more processors are configured to be capable of executing the programmed instructions and wherein the programmed instructions further comprises the instructions to:

generate a secret key based upon relative motion detected by the motion detection system between the chief device and each of a corresponding one of a plurality of communication devices initiating a secure communication, wherein the generated secret key between each pair of the chief device and each of the corresponding one of the communication devices initiating the secure communication is different and matches a corresponding secret key generated at the corresponding one of the communication devices generated based on the relative motion between the chief device and the corresponding one of the plurality of communication devices; and transmit one of the generated secret keys for one of the communication devices initiating the secure communication between the chief device and another one of the communication devices at least partially encrypted with the generated secret key for the another one of the communication devices to enable the secure communication with the one of the generated secret keys between the one of the communication devices and the another one of the communication devices.

12. The method of claim 11, wherein the programming instructions in the memory further comprises the instructions to:

synchronize signaling between the chief device and each of the corresponding one of the communication devices initiating a secure communication before the generate the secret key between the chief device and each of the corresponding one of the communication devices.

13. The method as set forth in claim 11, wherein the relative motion comprises the relative motion of the chief device with respect to each of the corresponding one of the communication devices.

14. The method as set forth in claim 11, wherein the relative motion comprises the relative motion of each of the corresponding one of the communication devices with respect to the chief device.

15. The method as set forth in claim 11, wherein the relative motion comprises the relative motion of each of the corresponding one of the communication devices and of the chief device with respect to each other.

16. The method as set forth in claim 11, wherein the communication devices comprise three or more of the communication devices and wherein the transmit the one of the generated secret keys securely provides the one of the generated secret keys to each of the three or more communication devices.

17. The method as set forth in claim 11, wherein the programming instructions in the memory further comprises the instructions to:

receive a request to initiate the secure communication between two or more of the communication devices, wherein the generate the secret key is initiated in response to the received request.

18. The method as set forth in claim 11, wherein the programming instructions in the memory further comprises the instructions to:

delete the generated secret keys for the communication devices initiating the secure communication once a common one of the generated secret keys is shared between the communication devices.

19. The method as set forth in claim 11, wherein the communication devices comprise three or more of the communication devices and wherein the programming instructions in the memory further comprises the instructions to:

store the generated secret key for each of the three or more communication devices; and utilize the stored generated secret key for each of two or more of the three or more communication devices which have requested initiation of the secure communication to enable the secure communication.

20. The method as set forth in claim 11, wherein the programming instructions in the memory further comprises the instructions to:

send a message encrypted with the generated secret key based upon relative motion detected by the motion detection system between the chief device and one of the communication devices to the one of the communication devices requesting a network address;

receive the network address encrypted with the generated secret key with the generated secret key based upon relative motion detected by the motion detection system between the chief device and one of the communication devices; and store the received network address with the generated secret key based upon relative motion detected by the motion detection system between the chief device and one of the communication devices.

* * * * *